US012323022B2

(12) United States Patent
Deak et al.

(10) Patent No.: US 12,323,022 B2
(45) Date of Patent: Jun. 3, 2025

(54) TANGENTIALLY ACTUATED MAGNETIC MOMENTUM TRANSFER GENERATOR

(71) Applicant: WePower Technologies LLC, Sagaponack, NY (US)

(72) Inventors: David Deak, Head Of The Harbor, NY (US); Michael Joseph Riddell, Glastonbury, CT (US); Lawrence Richenstein, Sagaponack, NY (US)

(73) Assignee: WEPOWER TECHNOLOGIES LLC, Sagaponack, NY (US)

( * ) Notice: Subject to any disclaimer, the term of this patent is extended or adjusted under 35 U.S.C. 154(b) by 0 days.

(21) Appl. No.: 18/632,943

(22) Filed: Apr. 11, 2024

(65) Prior Publication Data

US 2024/0348140 A1 Oct. 17, 2024

Related U.S. Application Data

(63) Continuation of application No. 17/756,236, filed as application No. PCT/US2020/061590 on Nov. 20, 2020, now Pat. No. 11,973,391.

(60) Provisional application No. 62/938,653, filed on Nov. 21, 2019.

(51) Int. Cl.
*H02K 35/02* (2006.01)
*H02K 7/06* (2006.01)
*H02K 7/18* (2006.01)

(52) U.S. Cl.
CPC .............. *H02K 35/02* (2013.01); *H02K 7/06* (2013.01); *H02K 7/1853* (2013.01); *H02K 7/1892* (2013.01)

(58) Field of Classification Search
CPC ........ H02K 35/02; H02K 7/06; H02K 7/1853; H02K 7/1892
See application file for complete search history.

(56) References Cited

U.S. PATENT DOCUMENTS

| | | |
|---|---|---|
| 1,711,323 A | 4/1929 | Oglesby |
| 2,703,370 A | 3/1955 | Johan |
| 3,027,499 A | 3/1962 | Holdway |
| 3,218,523 A | 11/1965 | Eugene |
| 3,315,104 A | 4/1967 | Barr |
| 3,348,080 A | 10/1967 | Lair |
| 3,398,302 A | 8/1968 | Hans-dieter et al. |
| 3,500,082 A | 3/1970 | Tolegian |
| 3,621,419 A | 11/1971 | Adams et al. |
| 3,671,777 A | 6/1972 | Newell |
| 3,673,999 A | 7/1972 | Lacy et al. |

(Continued)

*Primary Examiner* — Joseph Ortega
(74) *Attorney, Agent, or Firm* — Mintz, Levin, Cohn, Ferris, Glovsky, Popeo, PC.

(57) ABSTRACT

Systems, devices for a tangentially actuated magnetic momentum transfer generator, and methods of use thereof, are provided. In an aspect, the generator includes a plurality of turns of wire forming a coil, a rotating magnet positioned in the coil, at least one stationary magnet positioned about the coil, and a slider movable relative to the rotating magnet in a direction tangential to an outer surface of the rotating magnet are provided. The slider can be configured to cause rotation of the rotating magnet, and the rotation of the rotating magnet and/or an interaction of the rotating magnet with a magnetic field of one or more of the at least one stationary magnet and the slider magnet can induce a voltage across a first terminal end and a second terminal end.

20 Claims, 24 Drawing Sheets

(56) References Cited

U.S. PATENT DOCUMENTS

| | | | |
|---|---|---|---|
| 3,895,244 A | 7/1975 | Link |
| 3,984,707 A | 10/1976 | Mcclintock |
| 4,187,452 A | 2/1980 | Knappe et al. |
| 4,257,010 A | 3/1981 | Bergman et al. |
| 4,260,901 A | 4/1981 | Woodbridge |
| 4,315,197 A | 2/1982 | Studer |
| 4,363,980 A | 12/1982 | Petersen |
| 4,412,355 A | 10/1983 | Terbrack et al. |
| 4,471,353 A | 9/1984 | Cernik |
| 4,521,712 A | 6/1985 | Braun et al. |
| 4,703,293 A | 10/1987 | Ono et al. |
| 4,752,706 A | 6/1988 | Meszaros |
| 4,855,699 A | 8/1989 | Hoegh |
| 4,866,321 A | 9/1989 | Blanchard et al. |
| 4,870,306 A | 9/1989 | Petersen |
| 5,053,659 A | 10/1991 | Parker |
| 5,183,056 A | 2/1993 | Dalen et al. |
| 5,204,570 A | 4/1993 | Gerfast |
| 5,275,141 A | 1/1994 | Tsunoda et al. |
| 5,499,013 A | 3/1996 | Konotchick |
| 5,608,366 A | 3/1997 | Sako |
| 5,708,406 A | 1/1998 | Tsunoda et al. |
| 5,808,381 A | 9/1998 | Aoyama et al. |
| 5,872,407 A | 2/1999 | Kitaoka et al. |
| 5,990,583 A | 11/1999 | Nanba et al. |
| 6,069,420 A | 5/2000 | Mizzi et al. |
| 6,259,372 B1 | 7/2001 | Taranowski et al. |
| 6,326,714 B1 | 12/2001 | Bandera |
| 6,630,894 B1 | 10/2003 | Boyd et al. |
| 6,659,176 B2 | 12/2003 | Mahadevaiah |
| 6,700,310 B2 | 3/2004 | Maue et al. |
| 6,720,681 B2 | 4/2004 | Hsiao |
| 6,720,682 B2 | 4/2004 | Hatam-tabrizi et al. |
| 6,879,076 B2 | 4/2005 | Long |
| 7,015,778 B2 | 3/2006 | Fukushima et al. |
| 7,021,603 B2 | 4/2006 | Wygnaski |
| 7,026,900 B1 | 4/2006 | Gregory et al. |
| 7,106,159 B2 | 9/2006 | Delamare et al. |
| 7,151,332 B2 | 12/2006 | Kundel |
| 7,315,098 B2 | 1/2008 | Kunita et al. |
| 7,378,765 B2 | 5/2008 | Iwasa et al. |
| 7,382,106 B2 | 6/2008 | Kundel |
| 7,400,069 B2 | 7/2008 | Kundel |
| 7,436,082 B2 | 10/2008 | Ruse et al. |
| 7,495,656 B2 | 2/2009 | Yuba et al. |
| 7,688,036 B2 | 3/2010 | Yarger et al. |
| 7,710,227 B2 | 5/2010 | Schmidt |
| 7,906,877 B2 | 3/2011 | Ishiyama et al. |
| 7,906,920 B2 | 3/2011 | Imagawa |
| 8,148,856 B2 | 4/2012 | Bataille et al. |
| 8,299,659 B1 | 10/2012 | Bartol, Jr. |
| 8,330,283 B2 | 12/2012 | Lin |
| 8,514,040 B2 | 8/2013 | Gruner |
| 8,539,765 B2 | 9/2013 | Miller |
| 8,624,447 B2 | 1/2014 | Cartier Millon et al. |
| 8,629,572 B1 | 1/2014 | Phillips |
| 8,633,604 B2 | 1/2014 | Miller |
| 8,633,605 B2 | 1/2014 | Esteve Tinto et al. |
| 8,729,747 B2 | 5/2014 | Arnold et al. |
| 8,773,226 B2 | 7/2014 | Li et al. |
| 8,816,557 B2 | 8/2014 | Long et al. |
| 8,907,505 B2 | 12/2014 | Fortier et al. |
| 9,303,628 B2 | 4/2016 | Fortier et al. |
| 9,343,931 B2 | 5/2016 | Deak et al. |
| 9,543,817 B2 | 1/2017 | Deak, Sr. |
| 9,673,683 B2 | 6/2017 | Deak, Sr. |
| 9,843,248 B2 | 12/2017 | Deak, Sr. |
| 9,923,443 B2 | 3/2018 | Deak, Sr. |
| 10,270,301 B2 | 4/2019 | Deak, Sr. |
| 10,348,160 B2 | 7/2019 | Deak, Sr. |
| 10,396,642 B2 | 8/2019 | Petrick |
| 10,523,098 B1 | 12/2019 | Bowen |
| 10,707,706 B2 | 7/2020 | Yu |
| 10,855,158 B2 | 12/2020 | Hwang et al. |
| 11,251,007 B2 | 2/2022 | Deak, Sr. |
| 11,368,079 B2 | 6/2022 | Deak, Sr. |
| RE49,840 E | 2/2024 | Deak, Sr. |
| 11,915,898 B2 | 2/2024 | Deak, Sr. |
| 11,973,391 B2 | 4/2024 | Deak et al. |
| 2001/0045785 A1 | 11/2001 | Chen et al. |
| 2002/0070712 A1 | 6/2002 | Arul |
| 2002/0130561 A1 | 9/2002 | Temesvary et al. |
| 2002/0190610 A1 | 12/2002 | Andre et al. |
| 2003/0025416 A1 | 2/2003 | Sullivan et al. |
| 2003/0155771 A1 | 8/2003 | Cheung et al. |
| 2003/0197433 A1 | 10/2003 | Cheung et al. |
| 2004/0051416 A1 | 3/2004 | Yamada et al. |
| 2004/0078662 A1 | 4/2004 | Hamel et al. |
| 2004/0124729 A1 | 7/2004 | Long |
| 2004/0128781 A1 | 7/2004 | Kunita et al. |
| 2004/0174287 A1 | 9/2004 | Deak |
| 2004/0222709 A1 | 11/2004 | Naganuma et al. |
| 2005/0006961 A1 | 1/2005 | Shen |
| 2005/0023905 A1 | 2/2005 | Sakamoto |
| 2005/0168108 A1 | 8/2005 | Face |
| 2005/0280316 A1 | 12/2005 | Nozawa et al. |
| 2006/0175923 A1 | 8/2006 | Abou et al. |
| 2006/0234669 A1* | 10/2006 | Rode .................. H02K 7/1853 455/343.1 |
| 2006/0237968 A1 | 10/2006 | Chandrasekaran |
| 2006/0244316 A1 | 11/2006 | Kundel |
| 2006/0244327 A1 | 11/2006 | Kundel |
| 2006/0267418 A1 | 11/2006 | Kundel |
| 2008/0048506 A1 | 2/2008 | Deak |
| 2008/0079319 A1 | 4/2008 | Ishiyama et al. |
| 2008/0211435 A1 | 9/2008 | Imagawa |
| 2011/0001381 A1 | 1/2011 | Mcdaniel |
| 2011/0140563 A1 | 6/2011 | Beranger |
| 2011/0254285 A1 | 10/2011 | Hanchett, Jr. |
| 2011/0273052 A1 | 11/2011 | Long et al. |
| 2012/0104765 A1 | 5/2012 | Esteve et al. |
| 2012/0133234 A1 | 5/2012 | Da Costa Balas Ferreira |
| 2013/0033042 A1 | 2/2013 | Fortier et al. |
| 2013/0088018 A1 | 4/2013 | Kobayashi |
| 2013/0093540 A1 | 4/2013 | Ruff |
| 2013/0127268 A1 | 5/2013 | Atherton |
| 2013/0342037 A1 | 12/2013 | Kawarai et al. |
| 2014/0246961 A1 | 9/2014 | Smith |
| 2014/0375164 A1 | 12/2014 | Deak et al. |
| 2015/0015104 A1 | 1/2015 | Kataoka et al. |
| 2015/0076832 A1 | 3/2015 | Fortier et al. |
| 2015/0091395 A1 | 4/2015 | Spivak |
| 2015/0091479 A1 | 4/2015 | Spivak |
| 2015/0279598 A1 | 10/2015 | Matsumoto et al. |
| 2015/0357893 A1 | 12/2015 | Deak, Sr. |
| 2016/0134173 A1 | 5/2016 | Deak, Sr. |
| 2016/0204665 A1 | 7/2016 | Deak, Sr. |
| 2016/0359401 A1 | 12/2016 | Deak, Sr. |
| 2017/0077794 A1 | 3/2017 | Deak, Sr. |
| 2017/0346377 A1 | 11/2017 | Deak, Sr. |
| 2018/0145561 A1 | 5/2018 | Deak, Sr. |
| 2019/0131098 A1 | 5/2019 | Deak, Sr. |
| 2021/0135543 A1 | 5/2021 | Deak, Sr. |
| 2021/0143719 A1 | 5/2021 | Deak, Sr. |
| 2022/0020550 A1 | 1/2022 | Deak, Sr. |
| 2022/0416635 A1 | 12/2022 | Deak et al. |
| 2023/0137951 A1 | 5/2023 | Deak, Sr. |
| 2024/0363300 A1 | 10/2024 | Deak, Sr. |

* cited by examiner

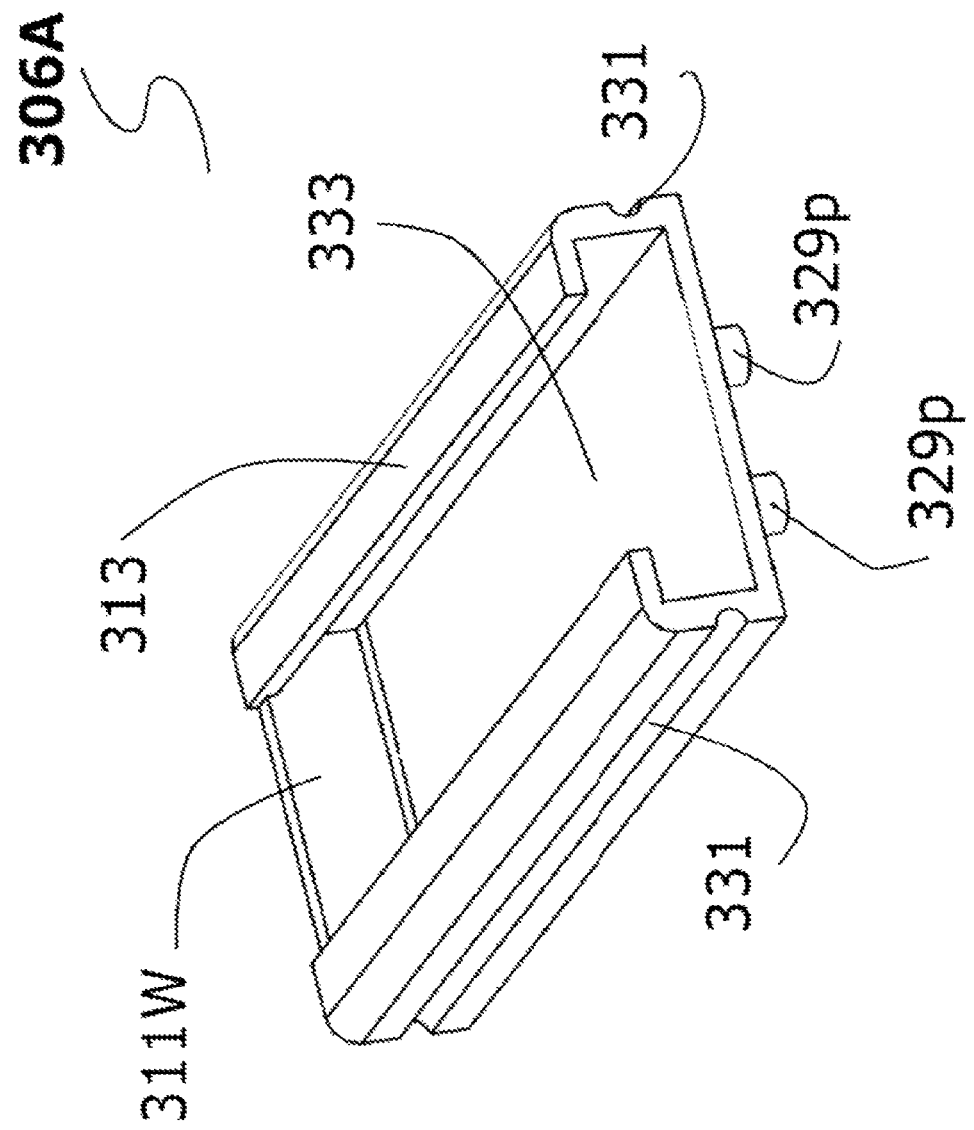

TANGENTIALLY ACTUATED MAGNETIC MOMENTUM TRANSFER GENERATOR

CROSS REFERENCE TO RELATED APPLICATIONS

This application is a continuation of U.S. patent application Ser. No. 17/756,236 filed on May 19, 2022, which is a national stage application filed under 35 U.S.C. § 371, of International Patent Application No. PCT/US2020/061590 filed on Nov. 20, 2020, which claims the benefit of and priority to U.S. Provisional Patent Application Ser. No. 62/938,653, filed on Nov. 21, 2019 and entitled "TANGENTIALLY ACTUATED MAGNETIC MOMENTUM TRANSFER GENERATOR". The entire contents of these applications are incorporated by reference herein in their entirety.

FIELD

The current subject matter relates to a tangentially actuated magnetic momentum transfer generator.

BACKGROUND

Tangential velocity relating to this subject matter is measured at any point tangent to the diameter of a cylindrical rotating magnet. The angular velocity, ω, of the rotating magnet is related to tangential velocity, vt through formula: vt=ω r. Here r is the radius of the magnet. Tangential velocity is also the component of motion along the edge of a circle measured at any arbitrary point thereon. As the name suggests, tangential velocity describes the motion of a circle along the tangent to that point.

First, the angular displacement Q is calculated, which is the ratio of the length of the arc S that an object traces on this circle to its radius r. It is the angular portion under the arc's shadow between the two lines originating from the center and connected to its ends. It is measured in radians. The rate of change of an object's angular displacement is called its angular velocity. It is denoted by ω and its standard unit is radians/second (rad/s). It is different from linear velocity, as it only deals with objects moving in circular motion. Basically, it measures the rate at which angular displacement is swept.

$$V = \Delta S/\Delta t, \quad (\text{eq. 1})$$

This is the linear velocity of the slider component that has disposed and stationary, a magnet that moves with the slider component that is magnetically coupled to the rotating magnet.

$$\omega = \Delta\theta/\Delta t, \quad (\text{eq. 2})$$

is the angular velocity of the rotating magnet
 S=distance of travel of the rotating magnet about its axis that is caused by the slider component movement (with its magnet).
The derivation of linear or tangential velocity in uniform circular motion of the rotating magnet, θ=S/r making v=r*Δθ/Δt or v=r*ω

The linear component of angular velocity is known as linear velocity, which is the rate of change of an object's linear displacement. Linear displacement is the arc S cited above—the length of the arc of rotation of the magnet as it is influenced and encouraged to move about its own axis of rotation. The time rate of change of the product of radius r and angular displacement θ is the object's linear velocity, which in this case for the embodiment is the accelerating movement of the slide magnet passing over the rotational magnet disposed and free to rotate within the center of the coil. The radius is excluded from the operation, as it is a constant, and the linear velocity is the product of the object's angular velocity and the radius of the circle it traces. The linear velocity of an object moving in a circle, measured at an arbitrary point, is the tangential velocity.

Another way to define linear velocity is in terms of time period. If the time period is the time required by an object to go around the circle once, then the velocity at which it does so is s/t (distance/time). The reciprocal of t is known as frequency and is denoted by f. This is the number of cycles achieved per second. The product of 2πf is known as angular frequency and is denoted by ω.

The Effects of Wire Gauge

The effect of coil wire gauge in electromagnetic energy harvesting generators, and all other types as well, is determined by several mathematical factors. Ergo, consider Ohm's Law for power;

$$P = V^2/R_1 (\text{induced voltage squared divided by} \quad (\text{eq. 3})$$

the load resistance) and now related to Faraday's Law;

$$P = \left(-Nd(B \cdot A)/dt\right)^2/R_1 \propto N^2/R_1 \quad (\text{eq. 4})$$

Definitions are:
N=No. of turns, $R_l$=load resistance, B=vectoral strength of the magnetic field,
A=coil cross section.

Further consider that the maximum transfer of power is when the coil resistance equals the load resistance. The smaller the coil of wire radius (r), the more turns N can be wound over a length and depth l and p is the specific resistance of the wire gauge.

$$\therefore N \propto 1/r \text{ Then } R_c = R_{coil} = pl \propto \left(1/r^2\right)(\pi dN) \propto \left(1/r^3\right) \quad (\text{eq. 5})$$

$$\text{Power} \propto N^2/R_c \propto \left(1/r\right)^2/\left(1/r\right)^3 \propto r \quad (\text{eq. 6})$$

However, the generated voltage decreases with the radius of the wire, as shown:

$$V_{coil} = Nd(B \cdot A)/dt \propto 1/r \quad (\text{eq. 7})$$

The Mathematical Derivation of the Inverse Cubed Law
This derivation theoretically applies to all forces, which obey the inverse square law when applied to point entities.

Electrostatic Force $FP=KQ_1Q_2/R^2$; $K=1/4\pi\varepsilon o$, $Q$=charge, $R$=distance Magnetic Force $FP=Um_1m_2/R^2$; $U=1/\mu$, $m$=magnetic monopoles strength, $R$=distance Gravitational Force $FP=GM_1M_2/R^2$; $G$=gravitational constant, $M$=mass, $R$=distance So, in general $FP = kX_1X_2/R^2$ (eq. 8)

where FP=force magnitude for point entities, k=constant, X=entity unit, R=distance between entities.

There is the definition of an additional parameter δ which in practice is a short distance between two-point entities forming a single dipole. Distance R will therefore define the much longer distance between the center of the dipole and another point entity X.

As shown in FIG. 1, the dipole is made up of two opposite entities +x and −x separated by a distance δ, acted at a much larger distance R by the point entity +X. Since the negative part of the dipole is attracted to +X, the dipole will orientate itself with the negative side facing +X point entity. Thus, if we measure distance R from the center point of the dipole to point +X, we find that the distance from +X to +x is R+δ/2 and that from +X to −x is R−δ/2. Therefore, since the distance between +X and −x is shorter than that between +X and +x, the force polarity between two opposite entities will govern the motion of the dipole with respect to the point entity. For opposite charges and magnetic poles, this means that a dipole will always move toward point +X, independently of the polarity of X.

The net force acting between the dipole and point entity X will be:

$$FD = kXx/(R - \delta/2)^2 - kXx/(R + \delta/2)^2 \quad \text{(eq. 9)}$$

we can rewrite the above in the form:

$$FD = [kXx/R2]/(1 - \delta/2R)^2 - [kXx/R2]/(1 + \delta/2R)^2 \quad \text{(eq. 10)}$$

For the condition δ<<2R, which was set as one of our assumptions, we are justified to apply the binomial approximation (1+x) n $$\approx 1 + nx, \text{ or } 1/(1 + x)n \quad \text{(eq. 11)}$$

$$\approx 1 - nx, \text{ valid for } x \ll 1. \text{ This reduces:}$$

$$1/(1 - \delta/2R)^2 \text{ to } 1 + \delta/R, \text{ and } 1/(1 + \delta/2R)^2 \text{ to } 1 - \delta/R \quad \text{(eq. 12)}$$

The force field equation can therefore be approximated as:

$$FD \approx [kXx/R^2]/(1 + \delta/R) - [kXx/R^2]/(1 - \delta/R) \quad \text{(eq. 13)}$$

$$FD \approx [kXx/R^2](1 + \delta/R - 1 + \delta/R) \quad \text{(eq. 14)}$$

$$FD \approx 2kXx\delta/R3 \text{ or simply } FD\alpha 1/R^3 \quad \text{(eq. 15)}$$

SUMMARY

Methods, devices, and systems for a tangentially actuated magnetic momentum transfer generator are provided. Related apparatus, techniques, and articles are also described.

In an aspect, an electrical generator is provided can include a plurality of turns of wire forming a coil, a rotating magnet positioned in the coil, at least one stationary magnet positioned about the coil, and a slider movable relative to the rotating magnet in a direction tangential to an outer surface of the rotating magnet. The plurality of turns of wire can include a first terminal end and a second terminal end. The rotating magnet can have an axis of rotation and can be rotatable within the coil about the axis of rotation. The slider can be configured such that, when the slider is moved from a first position in which the slider is aligned with the rotating magnet to a second position in which the slider is aligned with the at least one stationary magnet, the slider causes rotation of the rotating magnet from a first rest position to a limit position established by the slider and the at least one stationary magnet. The rotating magnet can be configured to oscillate before coming to rest at a second rest position, whereby the rotation of the rotating magnet and/or an interaction of the rotating magnet with a magnetic field of one or more of the at least one stationary magnet and the slider can induce a voltage across the first terminal end and the second terminal end.

One or more of the following features can be included in any feasible combination with any of the implementations and embodiments of the present subject matter described and shown herein. For example, the at least one stationary magnet can be configured to maintain the slider in the second position. For example, the slider can comprise a slider magnet. For example, the slider can comprise a slider magnet, the slider magnet can have a first magnetic polarity, the first magnetic polarity can have a first orientation, the at least one stationary magnet can have a second magnetic polarity, the second magnetic polarity can have a second orientation, and the first orientation can differ from the second orientation. For example, the slider magnet can include a north pole located at a first surface of the slider magnet and a south pole located at a second surface of the slider magnet, the second surface opposite the first surface, and the first surface of the slider magnet can face a south pole of the rotating magnet when the slider is in the first position. For example, the slider magnet can include a north pole located at a first surface of the slider magnet and a south pole located at a second surface of the slider magnet, the second surface opposite the first surface, and the first surface of the slider magnet can face a south pole of the at least one stationary magnet when the slider is in the second position. For example, the slider magnet can include a south pole located at a first surface of the slider magnet and a north pole located at a second surface of the slider magnet, the second surface opposite the first surface, and the first surface of the slider magnet can face a north pole of the rotating magnet when the slider is in the first position. For example, the slider magnet can include a south pole located at a first surface of the slider magnet and a north pole located at a second surface of the slider magnet, the second surface opposite the first surface, and the first surface of the slider magnet can face a north pole of the at least one stationary magnet when the slider is in the second position. For example, the slider can be configured such that, when the slider is moved from the second position to the first position, the slider causes repeated oscillations of the rotating magnet, whereby the rotation of the rotating magnet and/or an interaction of the rotating magnet with a magnetic field of one or more of the at least one stationary magnet and the slider can induce the voltage across the first terminal end and the second terminal end. For example, the electrical generator can include at least one second stationary magnet positioned about the coil opposite the at least one stationary magnet. For example, the slider can be configured such that, when the slider is moved from the second position, to the first position, and to a third position in which the slider is aligned with the at least one second stationary magnet, the slider causes repeated oscillations of the rotating magnet, whereby the rotation of the rotating magnet and/or an interaction of the rotating magnet with a magnetic field or one or more of the at least one stationary magnet and the slider can induce the voltage across the first terminal end and the second terminal end. For example, the at least one second stationary magnet can be configured to maintain the slider in the third position. For example, the slider magnet can include a north pole located at a first surface of the slider magnet and a south pole located at a second surface of the slider magnet, the second surface opposite the first surface, and the first surface of the slider magnet can face a south pole of the at least one second stationary magnet when the slider is in the third position. For example, the rotating magnet, the at least one stationary magnet, and the at least one second stationary magnet can be substantially aligned in a common plane. For example, the rotating magnet and the at least one stationary magnet can be substantially aligned in a common plane. For example, the plurality of turns of wire, the rotating magnet, and the at least one stationary magnet can be disposed in a substrate, and the slider can be coupled to the substrate. For example, the slider can include at least one nub positioned to contact the substrate and to reduce friction when the slider is moved from the first position to the second position.

In another aspect, an electrical generator is provided and can include a nanomaterial substrate having a first terminal end and a second terminal end, a rotating magnet positioned in the nanomaterial substrate, at least one stationary magnet positioned about the nanomaterial substrate, and a slider movable relative to the rotating magnet in a direction tangential to an outer surface of the rotating magnet. The nanomaterial substrate can have a first terminal end and a second terminal end. The rotating magnet can have an axis of rotation and be rotatable within the nanomaterial substrate about the axis of rotation. The slider can be configured such that, when the slider is moved from a first position in which the slider is aligned with the rotating magnet to a second position in which the slider is aligned with the at least one stationary magnet, the slider causes rotation of the rotating magnet from a first rest position to a limit position established by the slider and the at least one stationary magnet. The rotating magnet can be configured to oscillate before coming to rest at a second rest position, whereby the rotation of the rotating magnet and/or an interaction of the rotating magnet with a magnetic field of one or more of the at least one stationary magnet and the slider can induce a voltage across the first terminal end and the second terminal end.

In another aspect, an electrical generator is provided and can include a plurality of turns of wire forming a coil, a rotating magnet positioned in the coil, and a slider movable relative to the rotating magnet in a direction tangential to an outer surface of the rotating magnet. The plurality of turns of wire can include a first terminal end and a second terminal end. The rotating magnet can have an axis of rotation and can be rotatable within the coil about the axis of rotation. The slider can be configured such that, when the slider is moved from a first position in which the slider is aligned with the rotating magnet, to a second position in which the slider is not aligned with the rotating magnet, the slider causes rotation of the rotating magnet between a first rest position and a limit position. The rotating magnet can be configured to oscillate before coming to rest at a second rest position, whereby the rotation of the rotating magnet and/or an interaction of the rotating magnet with a magnetic field of the slider can induce a voltage across the first terminal end and the second terminal end.

The details of one or more variations of the subject matter described herein are set forth in the accompanying drawings and the description below. Other features and advantages of the subject matter described herein will be apparent from the description and drawings, and from the claims.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 8A is a perspective view of an exemplary slider guide which can be used with some implementations of the present subject matter and that includes four insert protrusions;

DETAILED DESCRIPTION

Figure 1:
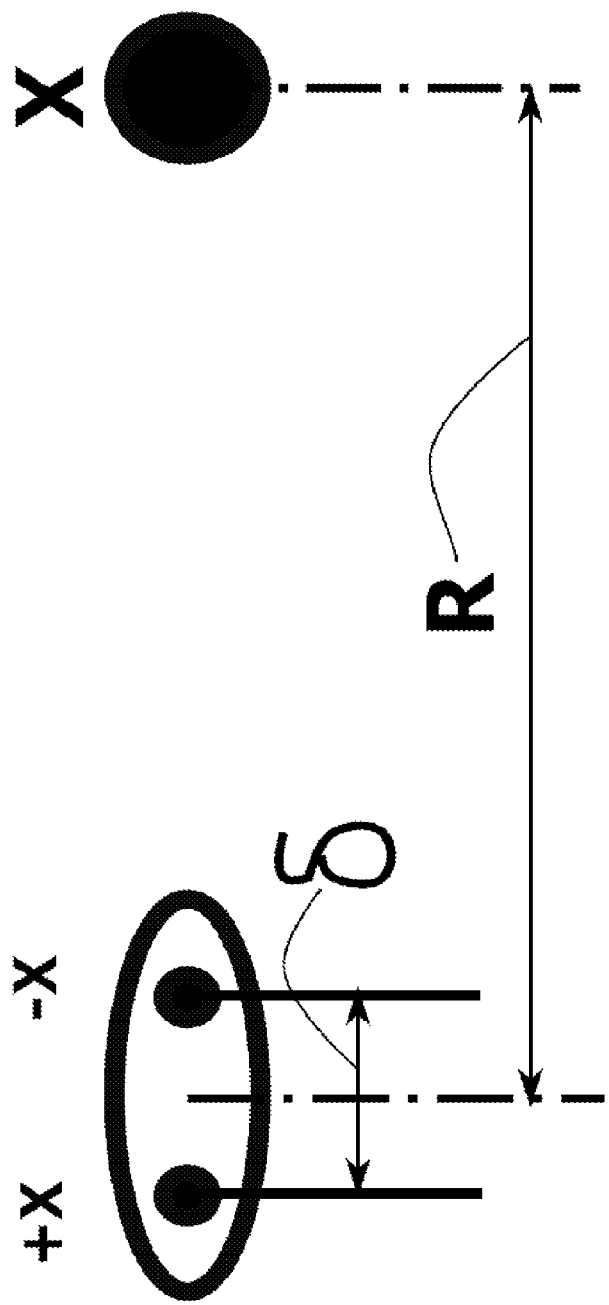
FIG. 1 is a schematic illustrating the inverse cube law as described in detail herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, devices and systems for a tangentially actuated magnetic momentum transfer generator, and methods of use thereof, are provided. In an aspect, the generation of an induced voltage in a coil winding is provided, whose causation is determined by the forward and reverse tangential velocity of a magnet disposed and stationary within a moving slide component, where both the magnet and the slide component bi-directionally move in unison. This tangential velocity (motion), by magnetic momentum transfer influences the rotational movement of a disposed rotating magnet that is centered within an induction coil. Further, at a first end opposite to the center coil and rotating magnet is disposed a stationary magnet that is polarized to encourage, upon a first motion cause, by an external force (e.g., applied finger action) of the slide component, and the movable slide component's magnet to become magnetically attracted to the stationary magnet; and this attraction causes a first positional state change that keeps the slide component stationary at the first end of the coil center until an external force (e.g., applied finger action) produces a second positional state change. Once a second external force is applied the state change's action now causes the slide component to come to rest above the rotating magnet within the coil's center. Ergo, any positional state change causes a voltage pulse to be felt at the coil terminal ends, and this voltage is available for instant electrical energy, for a determined time duration, to be used for any useful application.

The tangentially actuated magnetic momentum transfer generator gives rise to at least two energy-producing mechanisms; one whereby tangential velocity of a magnetically coupled slider results in an angular velocity of a rotating member directly responsible for electromagnetic induction by Faraday's Law, with the angular velocity being in direct relation to energy output, and the kinetic energy from such a rotating member exhibiting inertial properties having been accelerated to a radian velocity by such an tangential actuation whereby this kinetic energy may be seen in the form of angular oscillations around a terminal rest angular equilibrium position experiencing a magnetic-based other restoring force from any angular displacement from the terminal rest equilibrium position.

Figure 2:
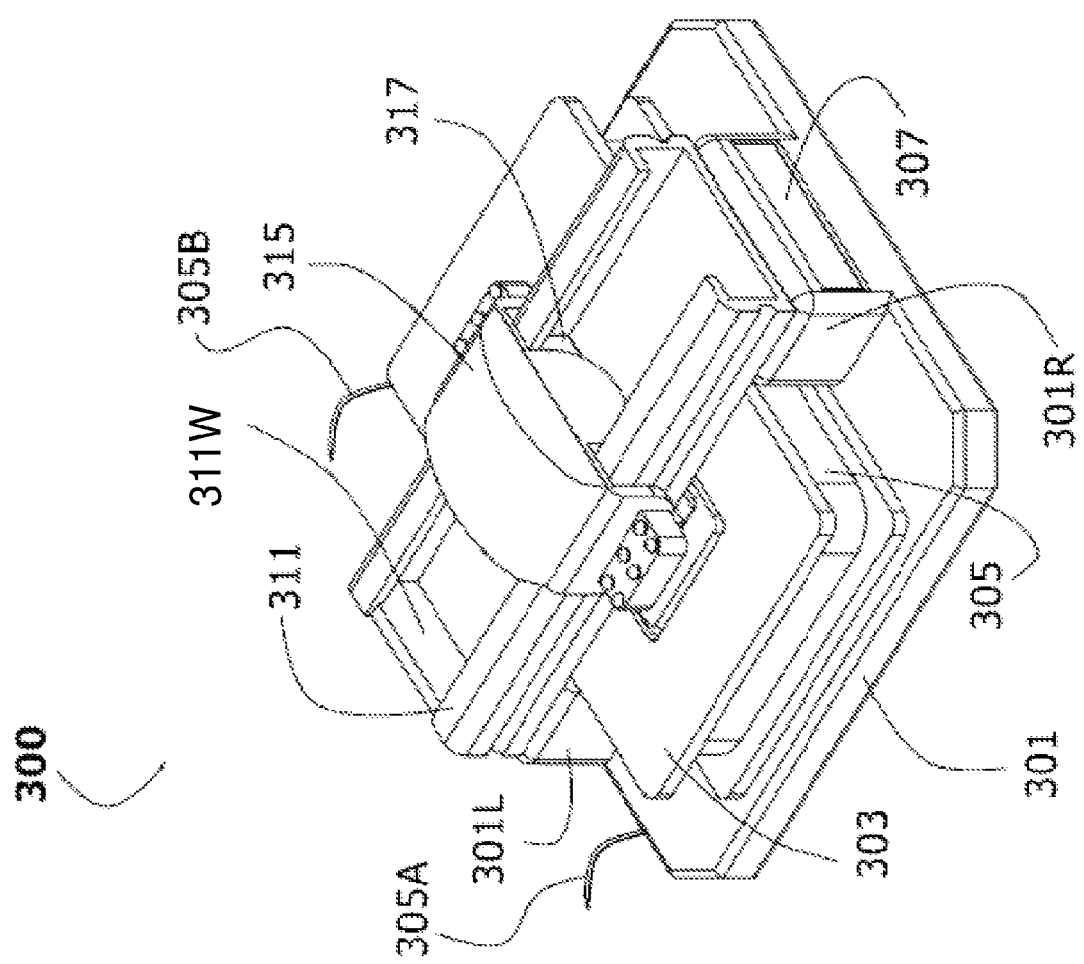
FIG. 2 is a perspective drawing of an exemplary embodiment of a tangentially actuated magnetic momentum transfer generator.
Figure 3:
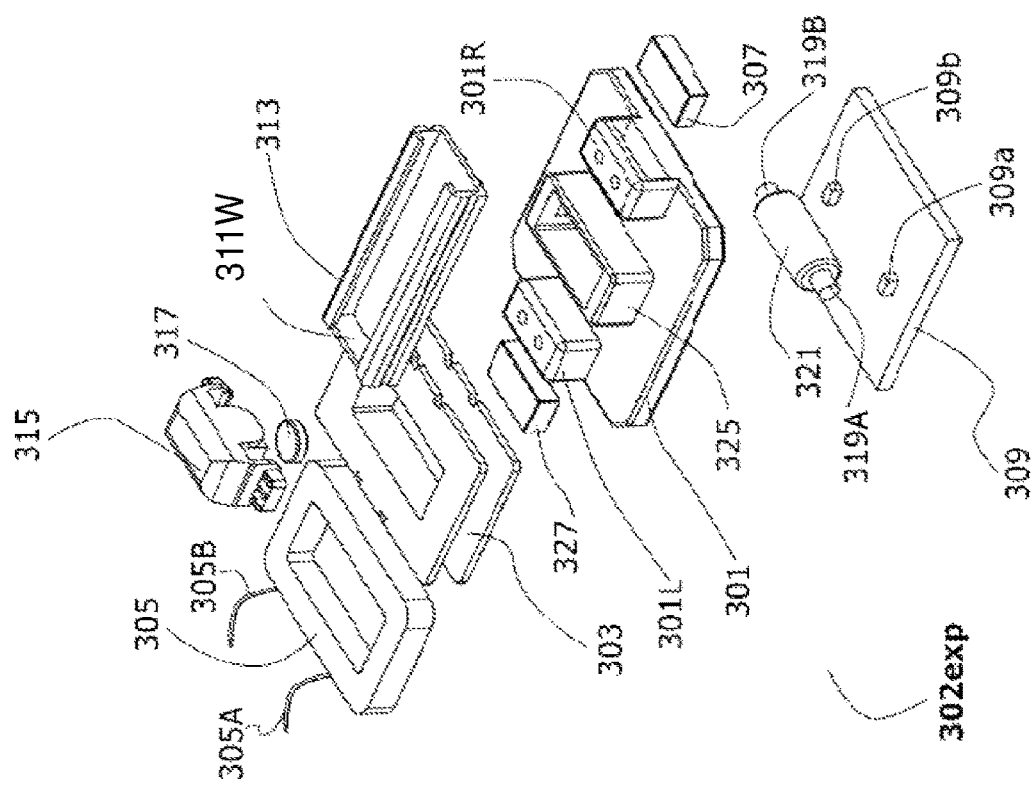
FIG. 3 is an exploded perspective drawing of the individual components of the tangentially actuated magnetic momentum transfer generator of FIG. 2.

FIG. 2 shows a perspective view of an exemplary embodiment of an energy harvesting generator 300, and FIG. 3 shows an exploded perspective view of the energy harvesting generator 300. As shown, the energy harvesting generator 300 includes a base substrate 301 coupled to a coil bobbin 303 having wire windings 305. The coil bobbin 303 has a center rectangular through hole that surrounds the center protrusion 325 (shown in FIG. 3), that is configured to hold and enclose a rotating magnet 321 and a centered through axle x1 that protrudes at the left side 319A and at the opposite right side 319B of the rotating magnet 321 (see FIG. 11, discussed in further detail below). A slider guide 311 is mounted over the coil bobbin 303 and disposed on the left stationary magnet compartment 301L and on the opposite right stationary magnet compartment 301R. The slider guide has one end abutment wall 311 that is configured to act as a stop limit for a slider 315 coupled to the slider guide 311 and that contains a slider magnet 317. Although slider magnet 317 is shown herein as a disk, in some implementations of the present subject matter, other magnet shapes (square, rectangle, oval, etc.) are possible and contemplated within the scope of this disclosure. As mentioned above, there are two stationary magnet compartments located at opposing ends of the device: a first left side compartment 301L to hold a first stationary magnet 327 (shown in FIG. 3), and a second right side compartment 301R to hold a second stationary magnet 307. In some implementations of the present subject matter, the first left side compartment 301L and the second right side compartment 301R may each include a cover disposed between slider magnet 317 and the first and second stationary magnets 327, 307 respectively. In other implementations of the present subject matter, the first left side compartment 301L and the second right side compartment 301R are omitted, leaving the first and second stationary magnets 327, 307 free-standing on base substrate 301. In some implementations of the present subject matter, the first and second stationary magnets 327, 307 are affixed on base substrate 301. In some implementations of the present subject matter, in lieu of first stationary magnet 327 and second stationary magnet 307, rotating magnets can be placed inside the first left side compartment 301L and the second right side compartment 301R. In addition, other types of magnet configurations for use in lieu of first stationary magnet 327 and second stationary magnet 307 are contemplated. Two exposed coil end terminals 305A & 305B are available for electrical connection to an electrical load for any useful purpose.

As shown in FIG. 3, which is an exploded perspective view 302exp of an exemplary embodiment of the energy harvesting generator has the base substrate 301 mounted with a disposed coil bobbin 303 with its wire winding 305 and the coil bobbin 303 has its center rectangular through hole that surrounds the center protrusion 325, whose purpose is to hold and enclose the rotating magnet 321 and its centered through axle 319 that protrudes at the left side 319A and at the opposite right side 319B. Also mounted over the coil bobbin 303 and sustained on the left stationary magnet compartment 301L and on the opposite right stationary magnet compartment 301R is the slider guide 311. The slider guide has one end abutment wall 311W that is the stop limit for the slider 315 with its disposed and slider magnet 317. There are two, at opposite ends, stationary magnet compartments; a first left side compartment 301L to hold a first stationary magnet 327, and a second right side compartment 301R to hold a second bar magnet 307. The freely rotating magnet 321 with its protruding through axle 319A & 319B is disposed within the rotating magnet shroud protrusion 325 and is held within the shroud protrusion 325 by and undercover 309 with two opposite ended axle support protrusions a first support protrusion 309A and a second support protrusion 309B. Two exposed coil winding 305 end terminals 305A & 305B are available for electrical connection to an electrical load for any useful purpose.

Figure 4A:
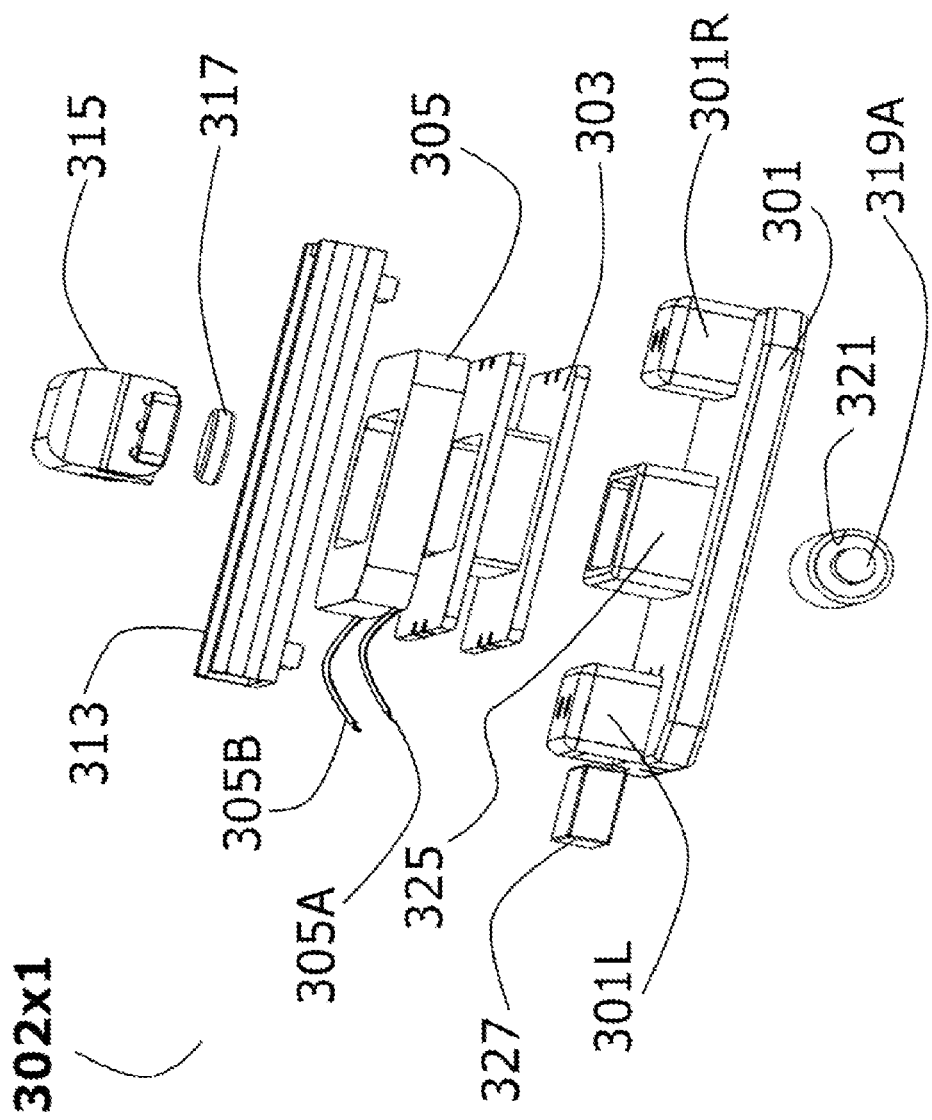
FIG. 4A is an exploded perspective drawing of an exemplary embodiment of the present subject matter including a singular stationary magnet disposed outside a coil winding.
Figure 4B:
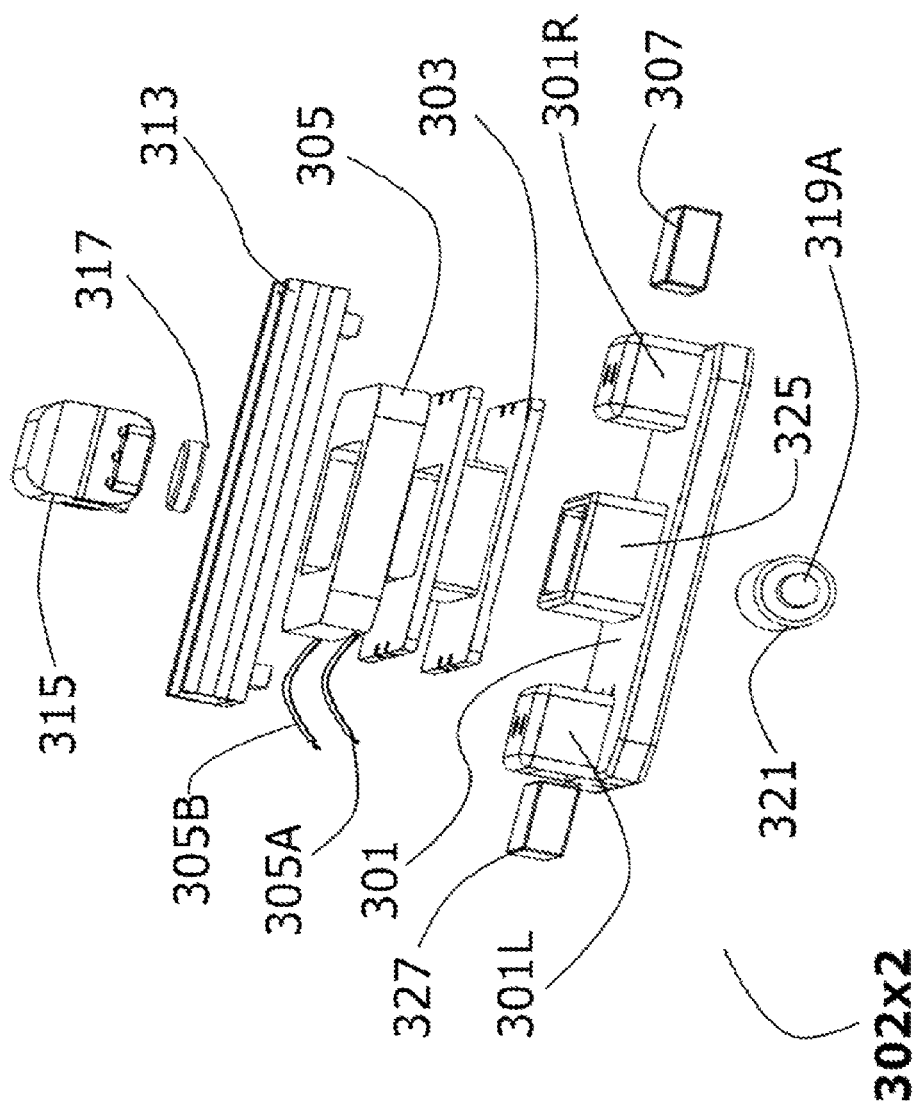
FIG. 4B is an exploded perspective drawing of an exemplary embodiment of the present subject matter including dual and separated stationary magnets at opposite ends of a coil winding.
Figure 4C:
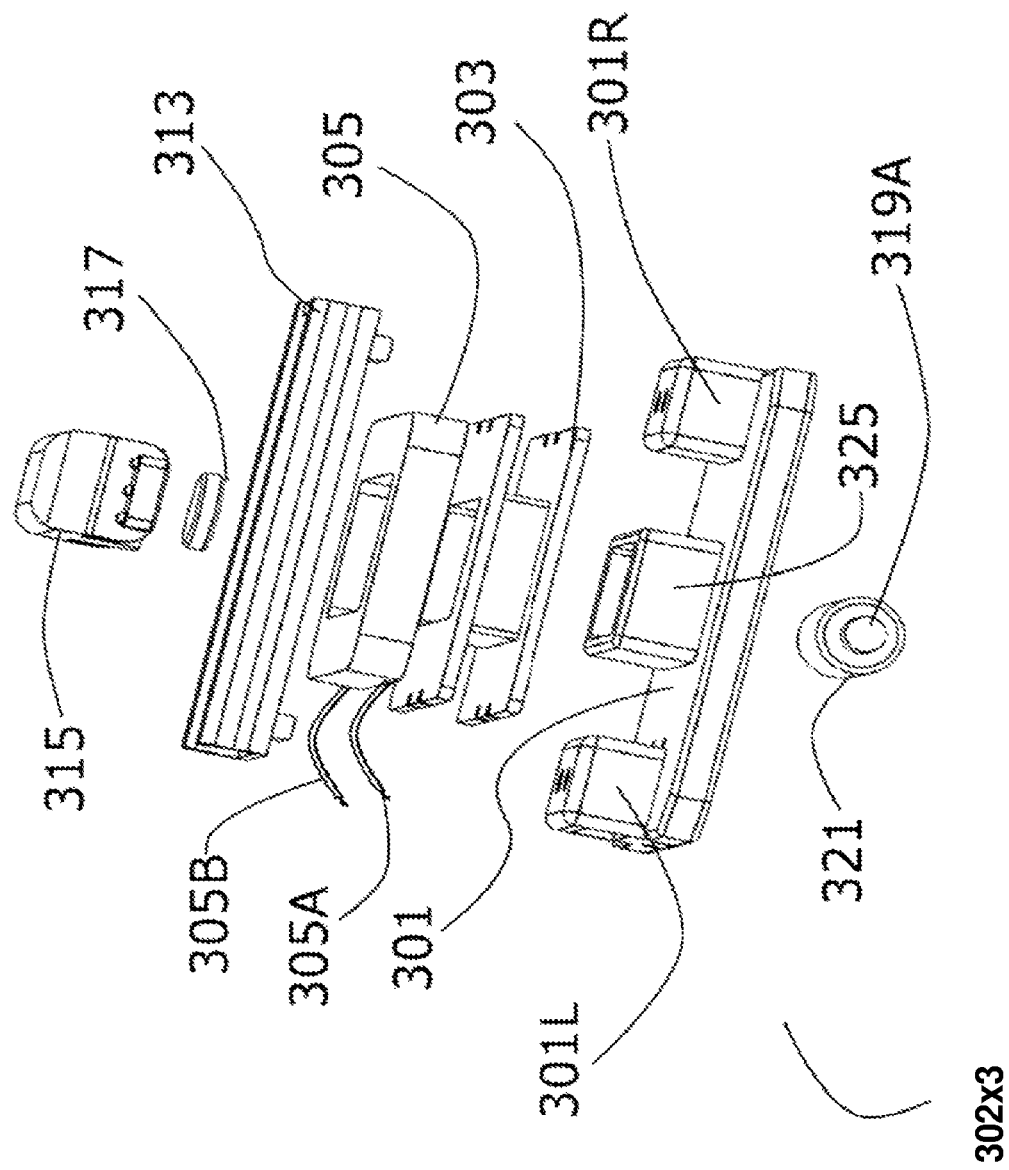
FIG. 4C is an exploded perspective drawing of an exemplary embodiment of the present subject matter that does not include any stationary magnets disposed outside a coil winding.

In some implementations, the energy harvesting generator can have one stationary magnet. FIG. 4A shows an exploded perspective view 302x1 of an exemplary embodiment of an energy harvesting generator that includes the components of the energy harvesting generator 300 shown in FIGS. 2 and 3 and described above, but differs in that the energy harvesting generator can include only one stationary magnet 327 disposed outside the coil winding 305. However, in some implementations, such as that shown in FIGS. 2 and 3 and described above, the energy harvesting generator can include both a first stationary magnet 327 and a second stationary magnet 307 disposed opposite the first stationary magnet 327. FIG. 4B shows an exploded perspective view 302x2 of the energy harvesting generator that shows the first stationary magnet 327 and the second stationary magnet 307. In some implementations, an energy harvesting generator can have no stationary magnets. FIG. 4C shows an exploded perspective view 302x3 of an exemplary embodiment of an energy harvesting generator that includes the components of the energy harvesting generator 300 shown in FIGS. 2 and 3 and described above, but differs in that the energy harvesting generator does not include either of stationary magnets 327, 307 disposed outside the coil winding 305.

Figure 5:
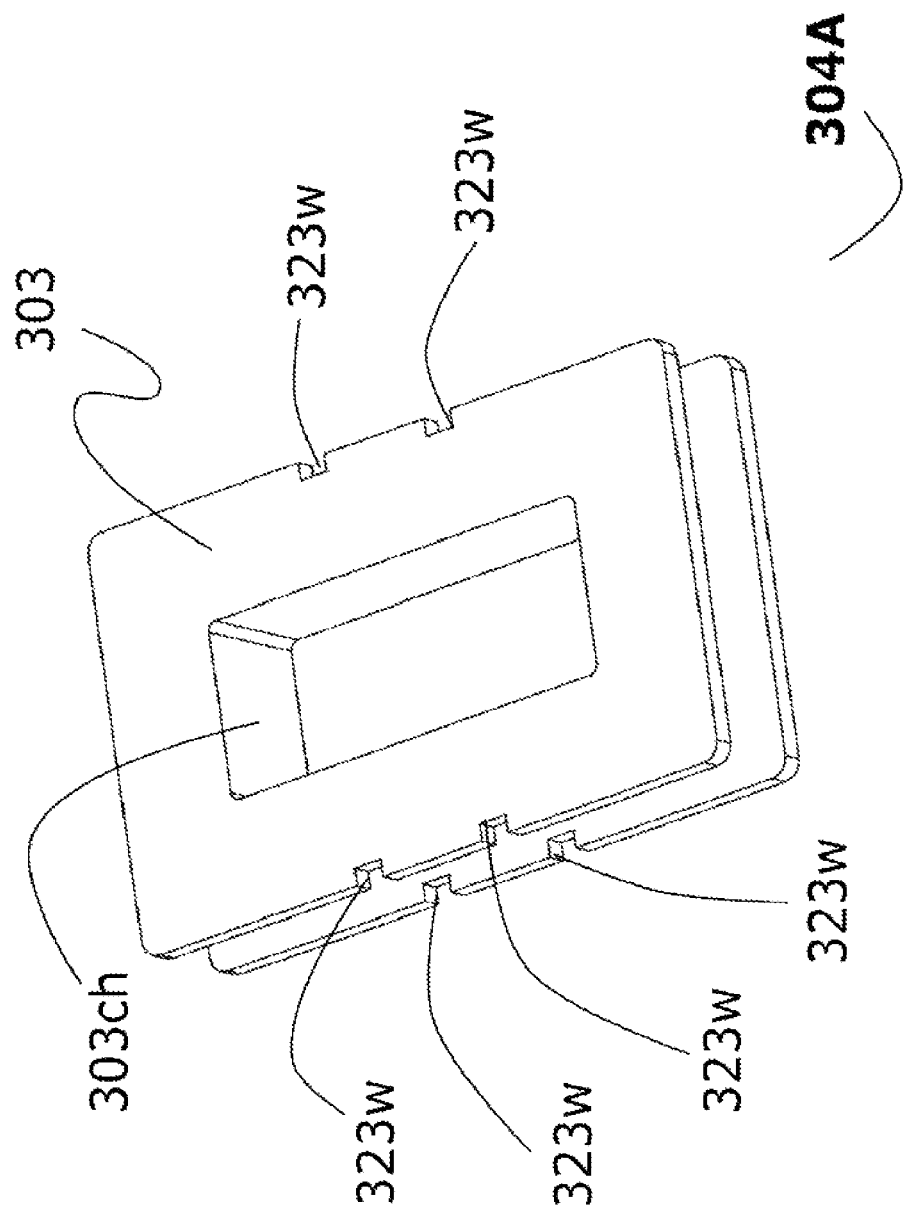
FIG. 5 is a perspective drawing of a rectangular coil bobbin with wire indent notches, according to an exemplary embodiment of the present subject matter.

FIG. 5 shows a perspective view 304A of the coil bobbin 303 of the generator 300 that has both top and bottom centralized notches 323w for wire channeling of the coil windings end terminals. In the present embodiment utilizing a coil winding, a coil bobbin is used but the coil embodiment itself is not limited to a coil bobbin; there are coil types do not have a physical bobbin structure that can be utilized, and that type consists only of the winding wire sans bobbin. In some implementations of the present subject matter, a substrate with conductive nanomaterials may be used in lieu of the winding wire to achieve a similar effect.

Figure 6A:
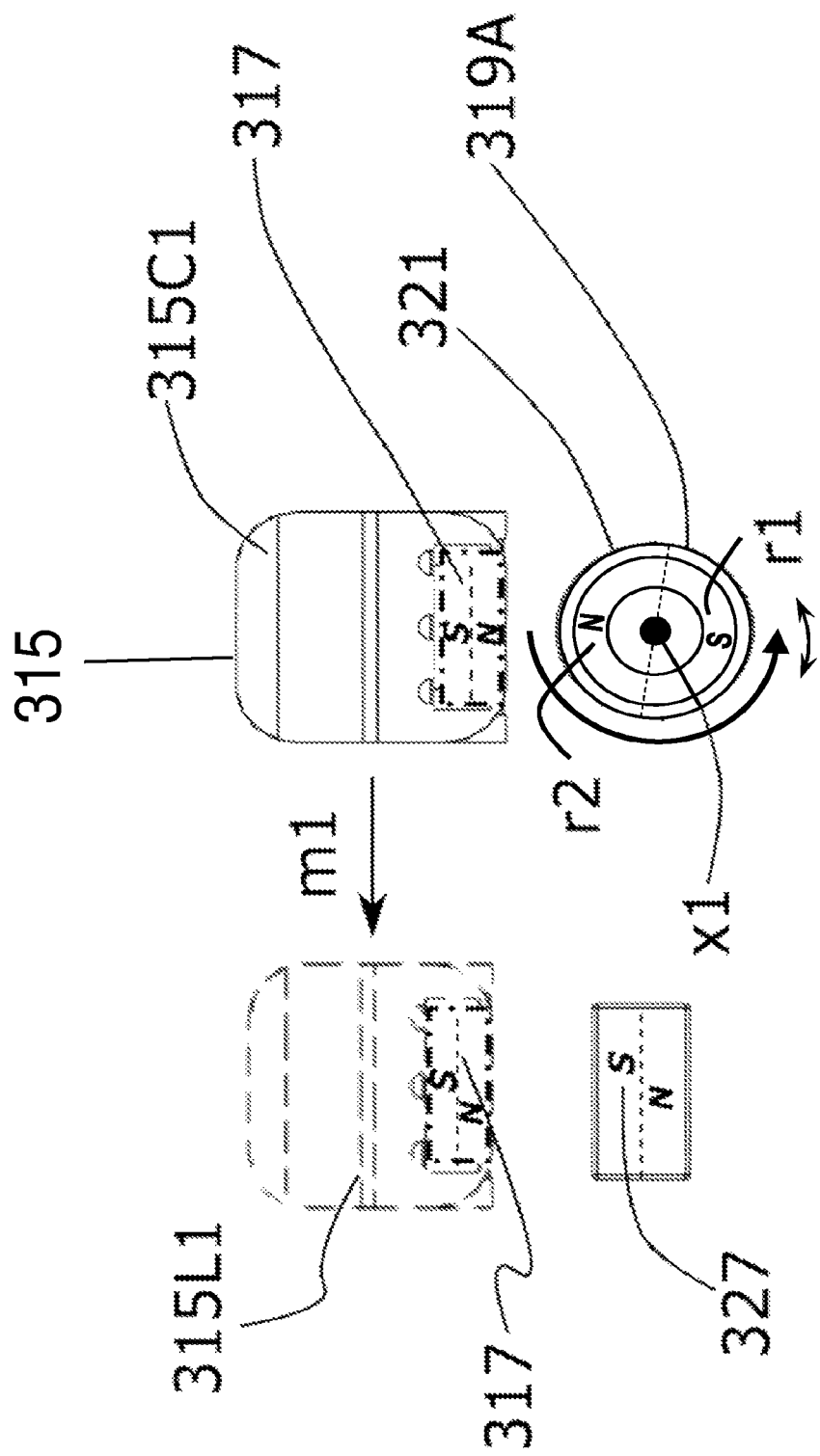
FIG. 6A is a side view drawing of an exemplary embodiment of the present subject matter demonstrating a position change during an initial action of movement of the slider moving over and past a rotating magnet, and moving further over to a stationary magnet.

FIG. 6A shows an illustration of an initial action of a slider, including slider magnet 317 described above, that is used in some implementations of the present subject matter. As shown, the slider 315, containing the disk magnet 317, is pushed from its first initial state, at center position 315C1 over the rotating magnet 321 with its center axis x1 and opposed ends 319A and 319B, and moved in the direction m1 to a second distal rest position 315L1 where the slider 315 and its disk magnet 317 are disposed over a stationary magnet, such as first stationary magnet 327. During this action, the rotating magnet 321, under the mutual north-south pole attractive magnetic field influence of the moving slider 317, produces a rotating torque on the rotating magnet 321 by a velocity eigen vector of the constant forward directional motion m1 towards the first stationary magnet 327 whose velocity vector eigenvalues instantly change linearly and determine the velocity rate and duration of the counter-clockwise rotational action of the rotating magnet 321. This rotational action of the rotating magnet 321 about its center axis x1 causes the south pole r1 and the north pole r2 to realign from a up and down position with the South pole upward to an increasingly angular counterclockwise position that approaches a rotational inversion of the north and south poles respectively. During the time of the rotating magnet's 321 rotation with its axles 319A & 319B around the center axis x1, the rotating magnet's 321 magnetic flux lines impart a time rate change of flux in the coil and instantly inducing a voltage in the coil felt at the coil's end terminal connections. A result of this first action of instantly moving the slider 315 from center position 315C1 to stop position 315L1 is to create the mutual coupling magnetic fields of slider 317 and the rotating magnet's 321 field force that decreases by the inverse cube of the distance between their associated attractive magnetic poles. As the slider magnet 317 reaches its final position at 315L1, the combination and magnetic interaction of slider magnet 317 and first stationary magnet 327 on rotating magnet 321 establishes a new equilibrium angular rest position of the rotating magnet 321. As the rotating magnet 321 has a mass and thus a moment inertia, the kinetic energy induced by an angular velocity of rotating magnet 321 results in a damped alternating oscillatory action about the final equilibrium position until finally coming to the rest equilibrium state as shown in FIG. 6A, in which the south pole of the rotating magnet 321, denoted by "S," is oriented downward. The induced voltage at the coil terminal ends will be a damped oscillatory waveform similar to the rotating magnet's 321 damped oscillatory angular motion.

Figure 6B:
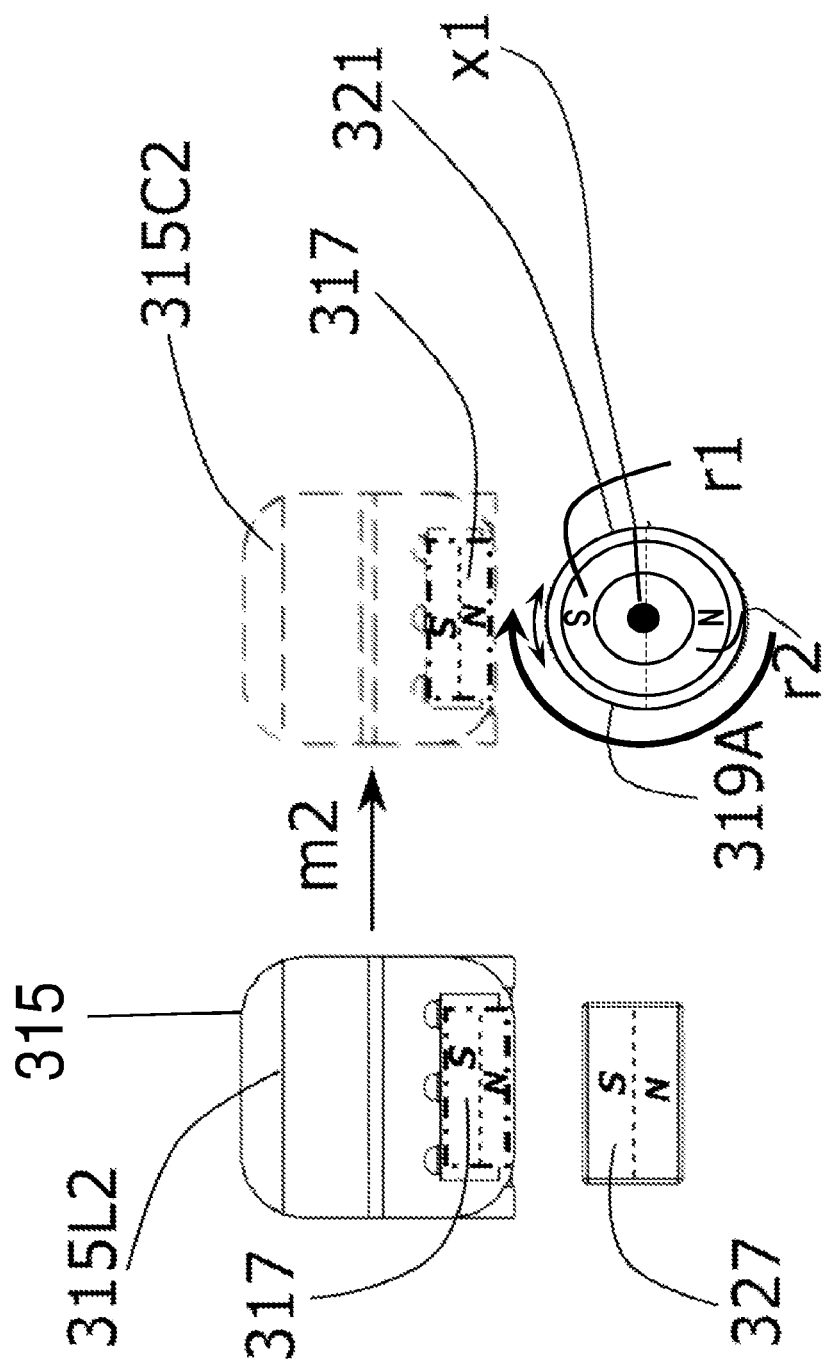
FIG. 6B is a side view drawing of an exemplary embodiment of the present subject matter demonstrating a position change of the slider in which the slider is being moved in reverse to a position over the rotating magnet.

FIG. 6B shows an illustration of a second action of slider 315, as shown in FIG. 6A, in which the slider 315 is pushed from its initial position 315L2, which can correspond to 315L1 as shown in FIG. 6A, that is distal from the rotating magnet 321 with its center axis x1 and opposed ends 319A and 319B, and moved in the direction m2 to a rest position 315C2 where the slider 315 and its slider magnet 317 are disposed over the rotating magnet 321. During this action, the rotating magnet 321 under the mutual north-south pole attractive magnetic field influence of the moving m2 slider magnet 317, produces a rotating torque on the rotating magnet 321 by a velocity eigen vector of the constant backward directional motion m2 towards the rotating magnet 321 whose velocity vector eigenvalues instantly change linearly and determine the velocity and duration of the clockwise rotational action of the rotating magnet 321. This rotational action of the rotating magnet 321 about its opposite end axles 319A & 319B cause the north pole r2 and the south pole r1 to realign from an up-down position with the South pole facing down to an increasingly angular clockwise position that approaches a rotational up-down position with south pole upward. During the time of the rotating magnet's 321 rotation with its axles 319A & 319B about the center axis x1, the rotating magnet's 321 magnetic flux lines pass through the coil at right angles, resulting in a time rate change of flux in the coil and instantly inducing a voltage in the coil felt at the coil's end terminal connections. A result of this second backwards action of moving the slider 315 from position 315L2 to position 315C2 is to create the mutual coupling magnetic fields of slider magnet 317 and the rotating magnet's 321 field force that decreases to the inverse cube of the distance between their associated attractive magnetic poles. With slider magnet 317 in the 315C2 position, the magnetic attraction between slider magnet 317 and rotating magnet 321, which are in close proximity to one another, dominates over magnetic influence of first stationary magnet 327. This strong mutual attraction establishes an equilibrium angular rest position for rotating magnet 321. As the rotating magnet 321 has a mass and thus a moment inertia, the kinetic energy induced by an angular velocity of rotating magnet 321 results in a damped alternating oscillatory action about the final equilibrium position until finally coming to the rest equilibrium state as shown in FIG. 6B, in which the south pole of the rotating magnet 321, denoted by "S," is oriented toward the slider magnet 317. The induced voltage at the coil terminal ends will be a damped oscillatory waveform similar to the rotating magnet's 321 damped oscillatory angular motion.

Figure 6C:
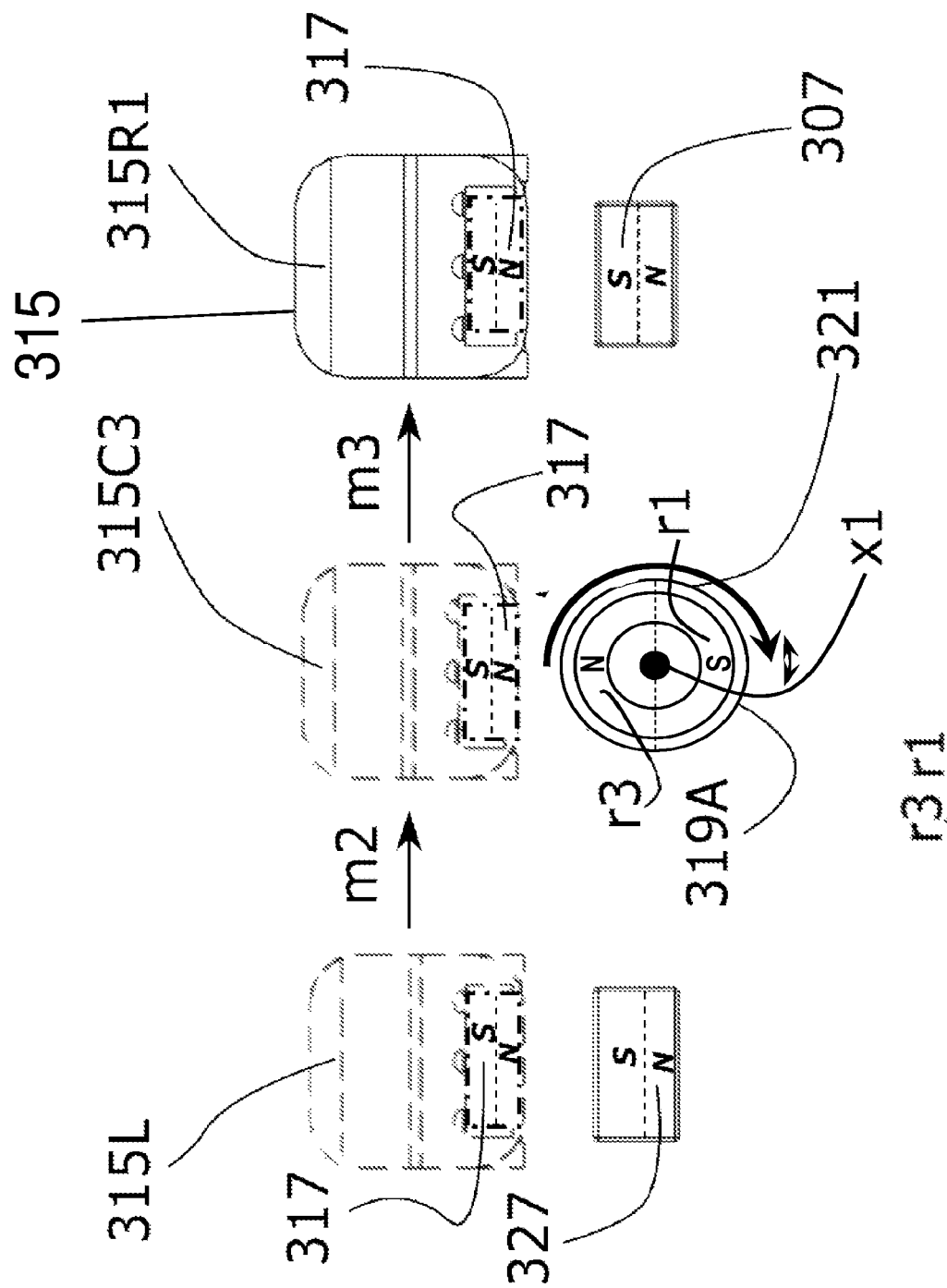
FIG. 6C is a side view drawing of an exemplary embodiment of the present subject matter demonstrating a position change of the slider in which the slider is being moved from a position over a first stationary magnet, past the rotating magnet, and to a position over a second stationary magnet opposite the first stationary magnet.

FIG. 6C is an illustration of a third action in which the slider 315, as shown in FIG. 6A, is pushed from an initial position 315C3 that is over the rotating magnet 321 and moved in the direction m3 to a rest position 315R1 in which the slider 315 and its slider magnet 317 are disposed over a second stationary magnet 307. During this action, the rotating magnet 321 under the mutual north-south pole attractive magnetic field influence of the moving m3 slider magnet 317, produces a rotating torque on the rotating magnet 321 by a velocity eigen vector of the constant forward directional motion m3 towards the second stationary magnet 307 whose velocity vector eigenvalues instantly change linearly and determine the clockwise rotational action of the rotating magnet 321. This rotational action of the rotating magnet 321 about its center axis x1 causes the south pole r1 and the north pole r3 to realign from a up and down position with the south pole upward to an increasingly angular clockwise position that approaches a rotational inversion of the north and south poles respectively. During the time of the rotating magnet's 321 rotation with its axles 319A & 319B around a reference axis x1, the rotating magnet's 321 magnetic flux lines pass through the coil at right angles, resulting in a time rate of change of flux in the coil and instantly inducing a voltage in the coil felt at the coil's end terminal connections. A result of this first action of instantly moving the slider from position 315C3 to rest position 315R1 is to create the mutual coupling magnetic fields of slider magnet 317 and the rotating magnet's 321 field force that decreases to the inverse cube of the distance between their associated attractive magnetic poles. As the moving slider magnet 317 reaches its final position at 315R1, the combination and magnetic interaction of slider magnet 317, second stationary magnet 307, and first stationary magnet 327 on rotating magnet 321 establishes a new equilibrium angular rest position for rotating magnet 321. As the rotating magnet 321 has a mass and thus a moment inertia, the kinetic energy induced by an angular velocity of 321 results in a damped alternating oscillatory action about the final equilibrium position until finally coming to the rest equilibrium state as shown in FIG. 6C, in which the South pole of the rotating magnet 321, denoted by "S," is oriented substantially downward. The induced voltage at the coil terminal ends will be a damped oscillatory waveform similar to the rotating magnet's 321 damped oscillatory angular motion.

The polarities of the magnets shown in FIGS. 6A-6C and described herein are indicated by the "N" and "S" notations shown in FIGS. 6A-6C. The north poles of each magnet are denoted by the region of each magnet featuring an "N", and the south poles of each magnet are denoted by the region of each magnet featuring an "S". As shown in FIG. 6A, the north pole of the slider magnet 317, when the slider 315 is in position 315C1, is oriented substantially toward the rotating magnet 321, and the south pole of the slider magnet 317 is oriented substantially away from the rotating magnet 321. As shown, when the slider 315 is in position 315L1, the north pole of the slider magnet 317 is oriented substantially toward the first stationary magnet 327, the south pole of the slider magnet 317 is oriented substantially away from the first stationary magnet 327, the north pole of the first stationary magnet 327 is oriented substantially away from the slider magnet 317, and the south pole of the first stationary magnet 327 is oriented substantially toward the slider magnet 317. As shown in FIG. 6B, when the slider 315 is in position 315C2, the south pole of the rotating magnet 321 is oriented substantially toward the slider magnet 317, the north pole of the rotating magnet is oriented substantially away from the slider magnet 317, the north pole of the slider magnet 317 is oriented substantially toward the rotating magnet 321, and the south pole of the slider magnet is oriented substantially away from the rotating magnet 321. As shown in FIG. 6C, when the slider 315 is in position 315R1, the north pole of the second stationary magnet 307 is oriented substantially away from the slider magnet 317, the south pole of the second stationary magnet 307 is oriented substantially toward the slider magnet 317, the north pole of the slider magnet 317 is oriented substantially toward the second stationary magnet 307, and the south pole of the slider magnet 317 is oriented substantially away from the second stationary magnet 307. In some implementations of the present subject matter, the magnetic polarities of one or more of the first stationary magnet 327 (if present in the implementation), the second stationary magnet 307 (if present in the implementation), the slider magnet 317, and the rotating magnet 321 shown in FIGS. 6A-6C and described herein may be reversed or inverted (e.g., from north to south, and from south to north) in various combinations.

Figure 6D:
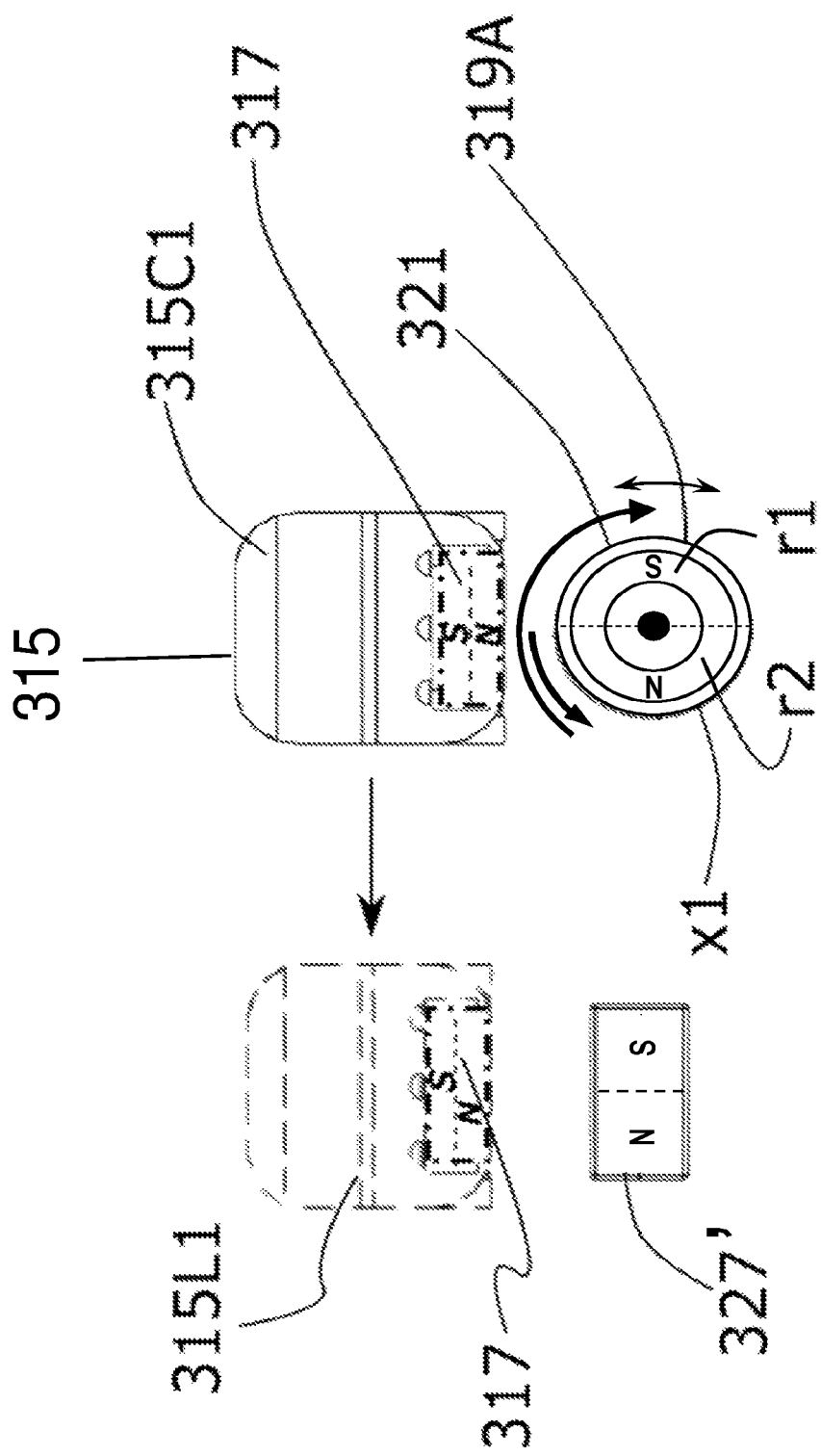
FIG. 6D is a side view drawing of an exemplary embodiment of the present subject matter that features a single, offset stationary magnet having an orientation of polarity that is offset by 90 degrees relative to an orientation of polarity of a slider, and demonstrates a position change of the slider in which the slider magnet is being moved between a position over a rotating magnet and a position over the single stationary magnet.

As shown in FIGS. 6A-6C, the magnetic polarities of the first and second stationary magnets 327, 307 and the slider magnet 317 have substantially the same orientation relative to one another. However, in some implementations, the orientation of the polarities of one or more of the stationary magnets 327, 307 and the slider magnet 317 may be modified such that the polarities of one or more of the magnets do not have substantially the same orientation relative to one another. An exemplary implementation of the present subject matter featuring a stationary magnet having such a modified magnetic polarity is schematically depicted in FIG. 6D. The embodiment shown in FIG. 6D is substantially similar to the energy harvesting generator 300 embodiments described herein and shown in FIGS. 2-4B, and can incorporate some or all of the components provided for use in the energy harvesting generator 300 as described herein. However, as shown, the embodiment of FIG. 6D utilizes a stationary magnet 327' that has a magnetic polarity that is offset by 90 degrees relative to the slider magnet 317. In this exemplary configuration, the south pole of the stationary magnet 327' is substantially oriented toward the rotating magnet 321, and the north pole of the stationary magnet 327' is substantially oriented away from the rotating magnet 321. In a first state, wherein the slider 315 and the slider magnet 317 are in position 315C1, in which the slider magnet 317 and the slider 315 are disposed over the rotating magnet 321, the north pole of the slider magnet 317 is substantially oriented toward the south pole of the rotating magnet 321, the south pole of the slider magnet 317 is substantially oriented away from the rotating magnet 321, and the north pole of the rotating magnet is substantially oriented away from the slider magnet 317. When the slider 315 is moved between position 315C1, and a position 315L1 in which the slider magnet 317 is disposed over the stationary magnet 327', the interaction of the magnetic fields generated by the slider magnet 317 and the rotating magnet 321 causes the rotating magnet 321 to rotate in the counterclockwise direction, such that the south pole of the rotating magnet 321 begins to become oriented toward the south pole of the stationary magnet 327', resulting in a repelling force that applies an opposing torque on rotating magnet 321 with respect to that which is created by the movement of slider magnet 317. As this occurs, the interaction of the magnetic fields generated by the rotating magnet 321 and the stationary magnet 327 causes the rotating magnet 321 to rotate in the clockwise direction with a snap action as the slider magnet 317 continues to traverse to the left toward 315L1, such that the north pole of the rotating magnet 321 begins to become attracted to the south pole of 327 and providing for dominant flux coupling. While slider magnet 317 becomes at rest with 315L1 position, rotating magnet 321 and first stationary magnet 327 interactions are dominant, and they will be aligned as shown in FIG. 6D with rotating magnet 321 coming to rest at an angular equilibrium position as shown. As the rotating magnet 321 has a mass and thus a moment inertia, the kinetic energy induced by an angular velocity of 321 results in a damped alternating oscillatory action about the final equilibrium position until finally coming to the rest equilibrium state as shown in FIG. 6D. The angular velocity of rotating magnet 321 during this repositioning due to the movement of slider 315 (and slider magnet 317) to 315L1 will induce a voltage at the terminal ends of a coil (such as coil winding 305 and first and second terminal ends 305A, 305B) that is disposed around the rotating magnet 321. The induced voltage at the coil terminal ends is a damped oscillatory waveform that corresponds to the rotating magnet's 321 velocity during travel and the damped oscillatory angular motion as it comes to rest.

Figure 7A:
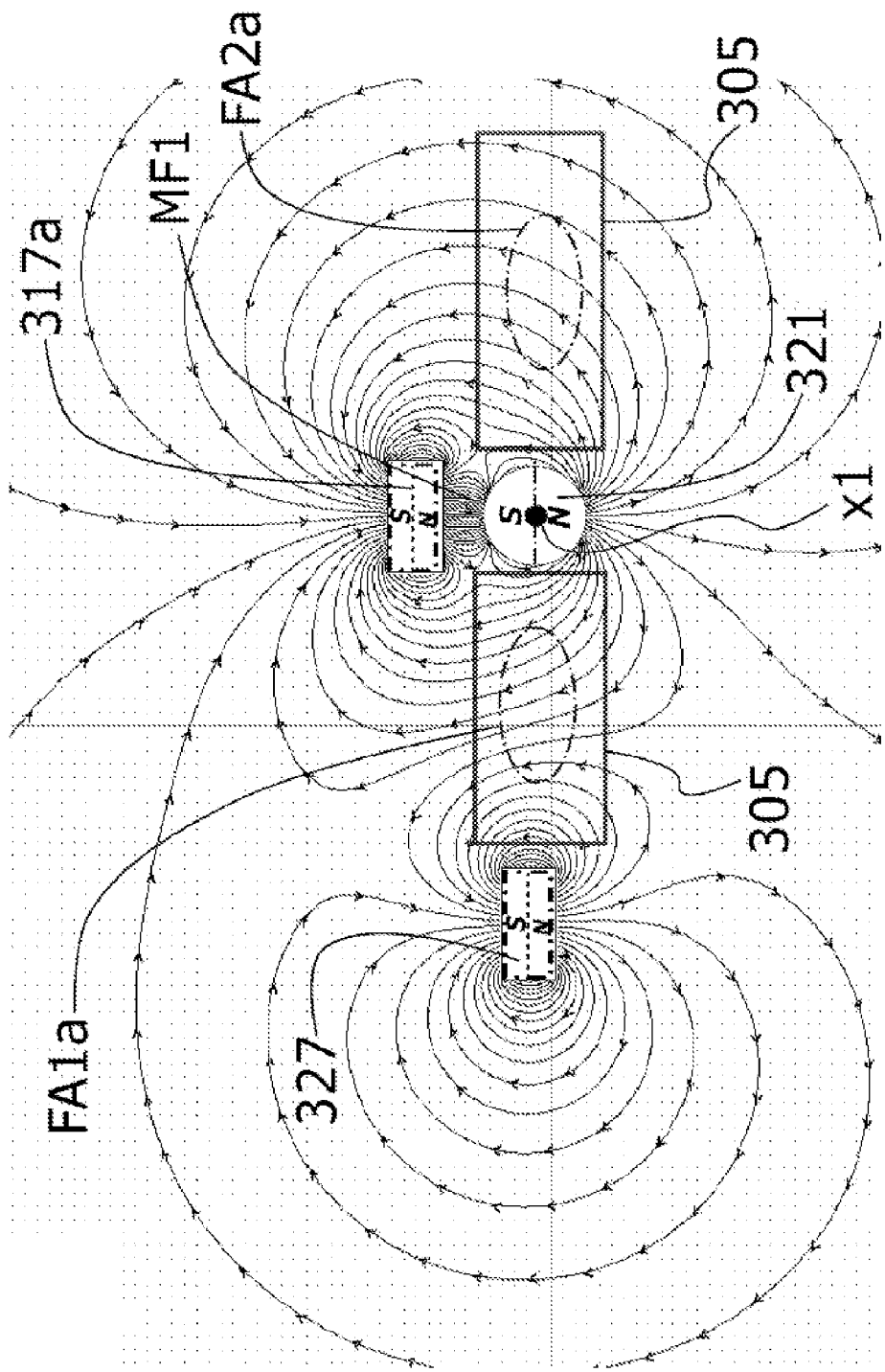
FIG. 7A is a schematic demonstrating the modeled magnetic field lines generated by the magnets of the embodiment shown in FIG. 4A when the slider is positioned over the rotating magnet.
Figure 11:
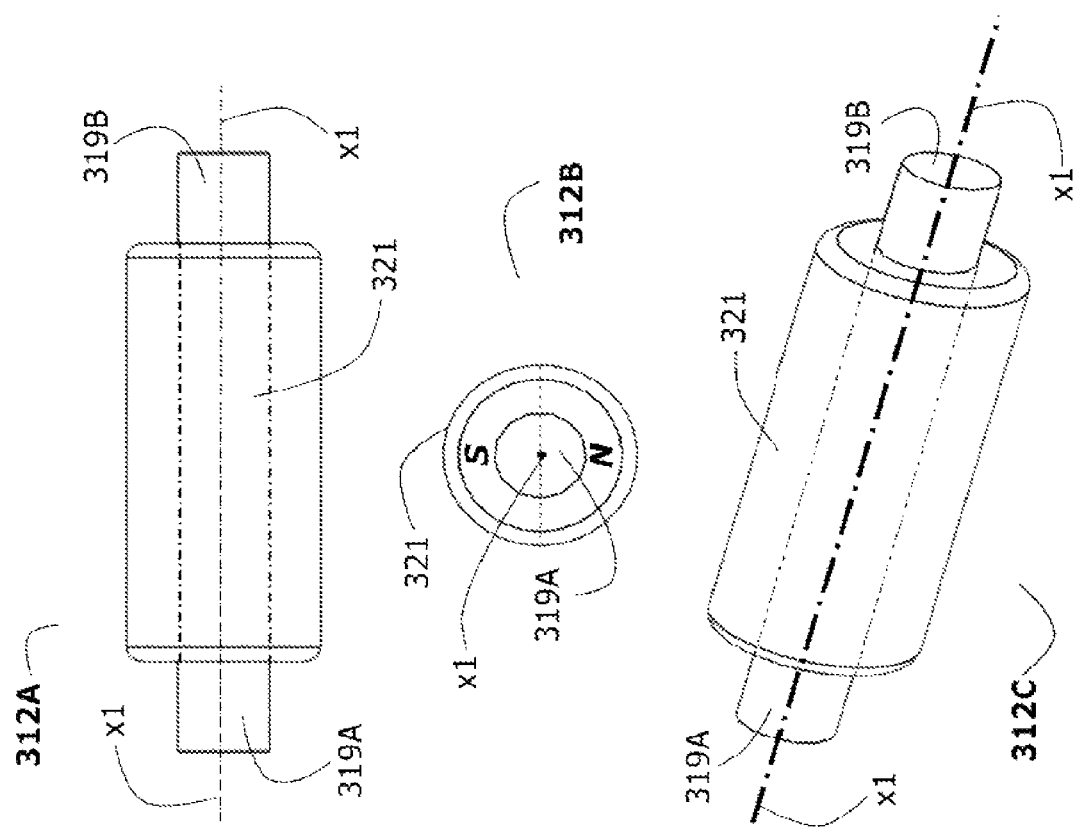
FIG. 11 includes three views of an exemplary rotating central magnet which can be used with some implementations of the present subject matter and includes a non-magnetic metal axle rod.

FIG. 7A is a two dimensional illustration of a computer simulation, created using the program called "Vizimag," of a static (e.g., no movement of the slider magnet 317) magnetic field pattern based on distances between associated magnets of typical Gauss strength used in an exemplary embodiment of the present subject matter of magnetic momentum transfer that utilizes a first stationary magnet 327, a rotating cylindrical magnet that is diametrically magnetized and free to rotate on its axles (319A & 319B as shown in FIG. 11) about its axis x1. In addition to this combination of magnets is the slidable magnet 317, which is shown in its rest position (e.g., prior to being triggered) 317a. The slidable magnet 317, as illustrated in FIGS. 6A-6C, is disposed within the slider component (shown in FIG. 9B) and is free to slide along the slider guide 311 (shown in FIGS. 8A-8B) once the slider 315 is actuated, and the sliding action is encouraged by the mechanical communication between the dual slider runner rails 339s (shown in FIGS. 9A-9B) and the runner guide channels 331 (shown in FIGS. 8A-8B).

In this static state of an exemplary pre-initialized embodiment, the slider magnet 317 is positioned proximal at rest over the rotating magnet 321 and the magnetic attractive pole alignment between these two magnets offers a strong concentrated magnetic force field MF1 that exist with these proximal magnet positions. There are also a number of magnetic lines of force that permeate and surround the coil 305. In this configuration, the magnetic field lines are static (e.g., no movement of the magnets) in these regions FA1a & FA2a and are three dimensional volumetric in nature. With static nonmoving magnetic lines of force, the convention is to term them field lines of magnetic potential force, and when the lines of force are in motion, they are termed flux lines of magnetic kinetic force.

In FIG. 7A, the exemplary embodiment shown is that which features a single stationary magnet 327 that in conjunction with the rotating magnet 321 establishes an encompassing magnetic field FA1a and FA2a throughout the coil windings. In a nonmoving static state, before any push action takes place on the slider mechanism 315 with its disposed slider magnet 317 that is positioned proximal over the rotating magnet 321, the established magnetic field FA1a and FA2a remains static and there is no electromagnetic interaction of changing flux lines of force throughout the coil windings and thus no electrical power generated.

Figure 7B:
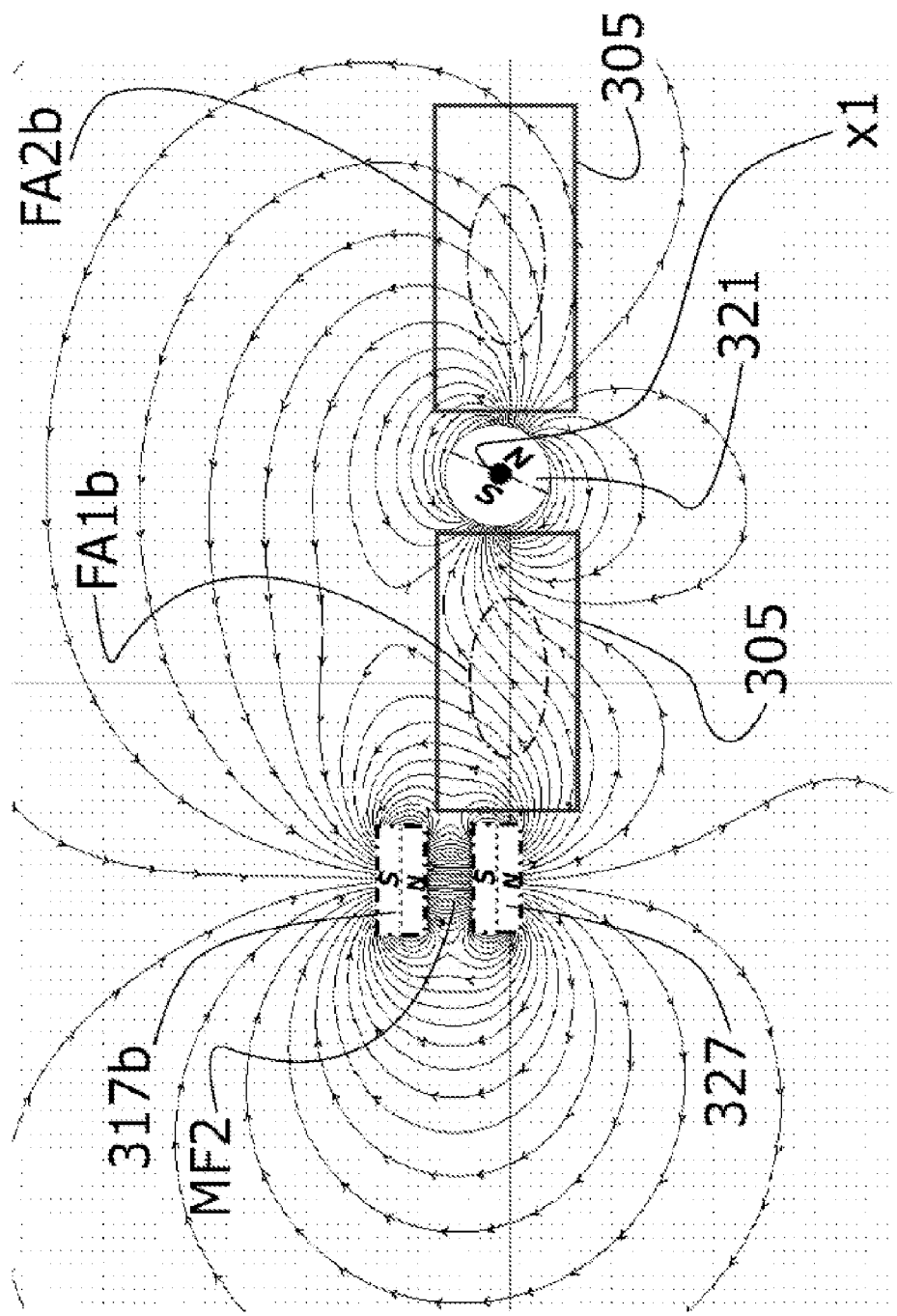
FIG. 7B is a schematic demonstrating the modeled magnetic field lines generated by the magnets of the embodiment shown in FIG. 4A when the slider is positioned over the stationary magnet with an arbitrary rotating magnet angular position.

FIG. 7B is a two dimensional illustration of a computer simulation, created using "Vizimag," of the magnetic field pattern of a generator in a state representative of an "ON" state of the device. (if the present subject matter is utilized as a battery-less and wireless remote switch), wherein the slider 315 (see FIG. 9A) and its disposed slider magnet 317b (see FIG. 9B) are pushed (by an external force) forward to be disposed over the stationary magnet 327. There exists a strong concentrated attractive magnetic field MF2 that keeps the slider and magnet in an equilibrium state proximal over the stationary magnet 327 until there is a push force to move it in reverse action back to the center position and this represents an OFF state (if the present subject matter is utilized as a battery-less and wireless remote switch).

FIG. 7B illustrates a state in which the exemplary embodiment utilizing the single stationary magnet 327 has been pushed by an external force to trigger the action of creating a changing magnetic flux FA1b & FA2b throughout the coil winding 305 and causing the rotating magnet 321y to rotate anti-clockwise as the mechanism behind the changing magnetic flux FA1*b* & FA2*b* and where the slider magnet 317 moves to a position proximal over the stationary magnet 327 and held stationary with the aid of the mutual concentrated attractive magnetic field MF2 of the stationary magnet 327 and the slider magnet 317. This action now places the slider magnet 317 distal from the rotating magnet 321. The translational movement of the slider magnet 317 to the position shown in FIG. 7B causes an oscillation of the rotating magnet 321, which establishes a voltage to be felt at the coil winding 305 end terminals 305A & 305B.

Figure 7C:
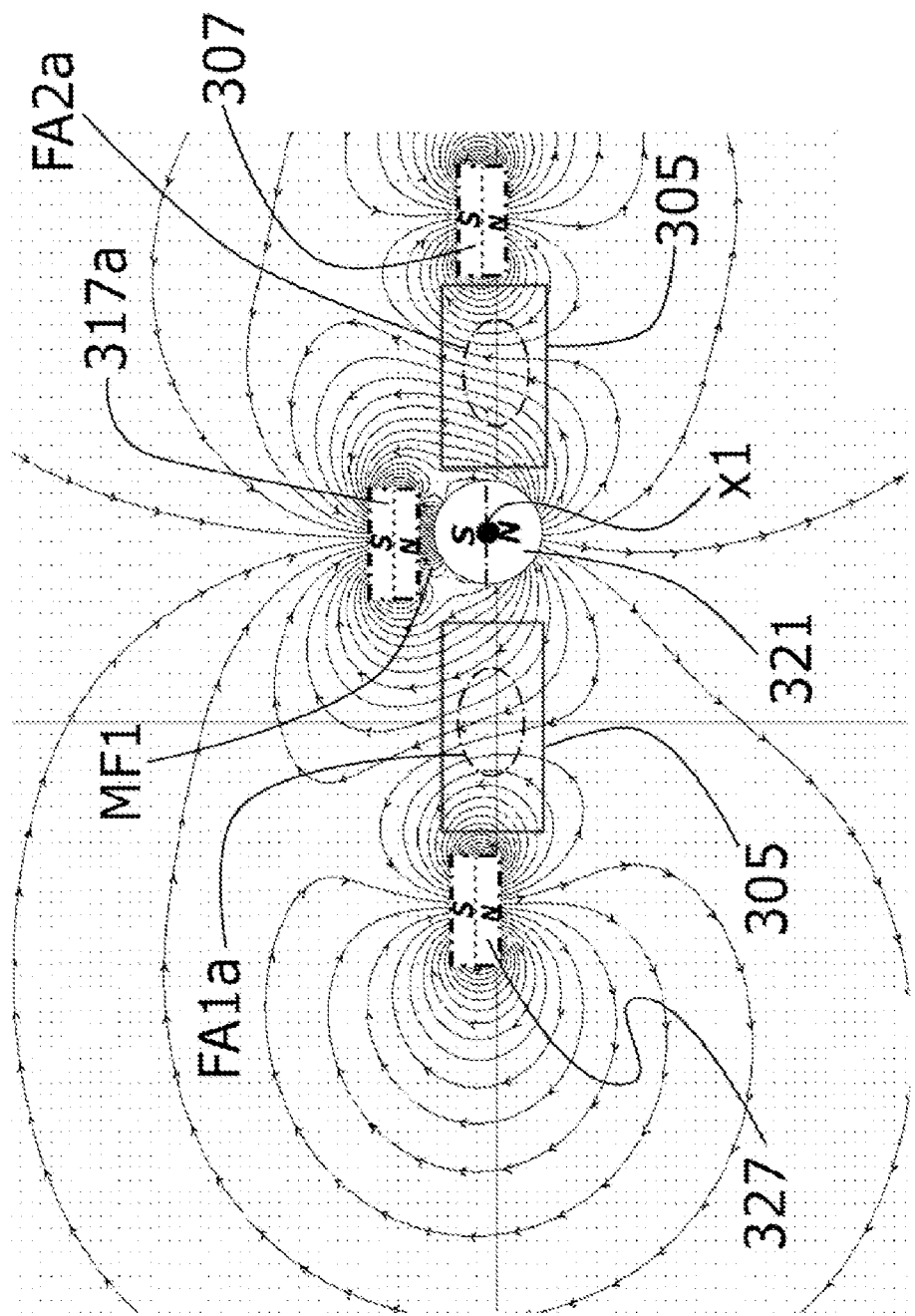
FIG. 7C is a schematic demonstrating the modeled magnetic field lines generated by the magnets of the embodiment shown in FIG. 4B when the slider is positioned over the rotating magnet.

FIG. 7C is a two dimensional illustration of a computer simulation, created using "Vizimag," of the magnetic field pattern of another embodiment of a generator wherein there exists a first stationary magnet 327 disposed at the first end of a coil winding 305 and an additional second stationary magnet 307 disposed at an opposite end of the coil 305. As shown, in this configuration, there is during a movable slider magnet 317 at position 317*a* located over the rotating magnet 321 that is rotatable on its axles 319A & 319B about its axis x1 (refer to FIG. 11) and whose mutual attractive magnetic field between both the rotating magnet 321 and the slider magnet 317 disposed within the slider 315 (shown in FIG. 11). During the depicted pre-triggered (not pushed by any force) state, there exists a strong attractive mutual magnetic force field MF1 between the slider magnet 317*a* and the rotating magnet 321 that is diametrically magnetized and free to rotate on its axles (319A & 319B shown in FIG. 11) about its axis x1. There are also a number of magnetic lines of force that permeate and surround the coil 305, where the magnetic field lines are static (e.g., no movement) in these regions FA1*a* & FA2*a*, which are three dimensional volumetric in nature. With static nonmoving magnetic lines of force, the convention is to term them field lines of magnetic potential force, and when the lines of force are in motion, they are termed flux lines of magnetic kinetic force. Ergo, during the static period there is no movement nor are there any changes in the magnetic field regions FA1*a* & FA2*a* permeating through the coil windings and thus there is no induced voltage that is established at the coil winding ends 305A & 305B (shown in FIG. 3).

In FIG. 7C, the exemplary embodiment shown is that which features two opposite stationary magnets 327 & 307 on opposite side of the coil winding 305 and both are proximal to the coil winding 305 on each of their magnetic attractive poles and distal from each other's magnetic attractive poles. During a non-triggered state (no push external force applied) the slider magnet 317 is proximal over the rotating magnet 321 and there is a strong concentrated magnetic field between the slider magnet 317 and the rotating magnet 321 and the pole alignment of the rotating magnet is South pole facing upward and its North pole facing downward, which is attracted to the same pole alignment of the slider magnet 317 that is South pole upward and North pole downward. As there is no state change, there is no flux change and no induced voltage at the output terminals 305A & 305B.

Figure 7D:
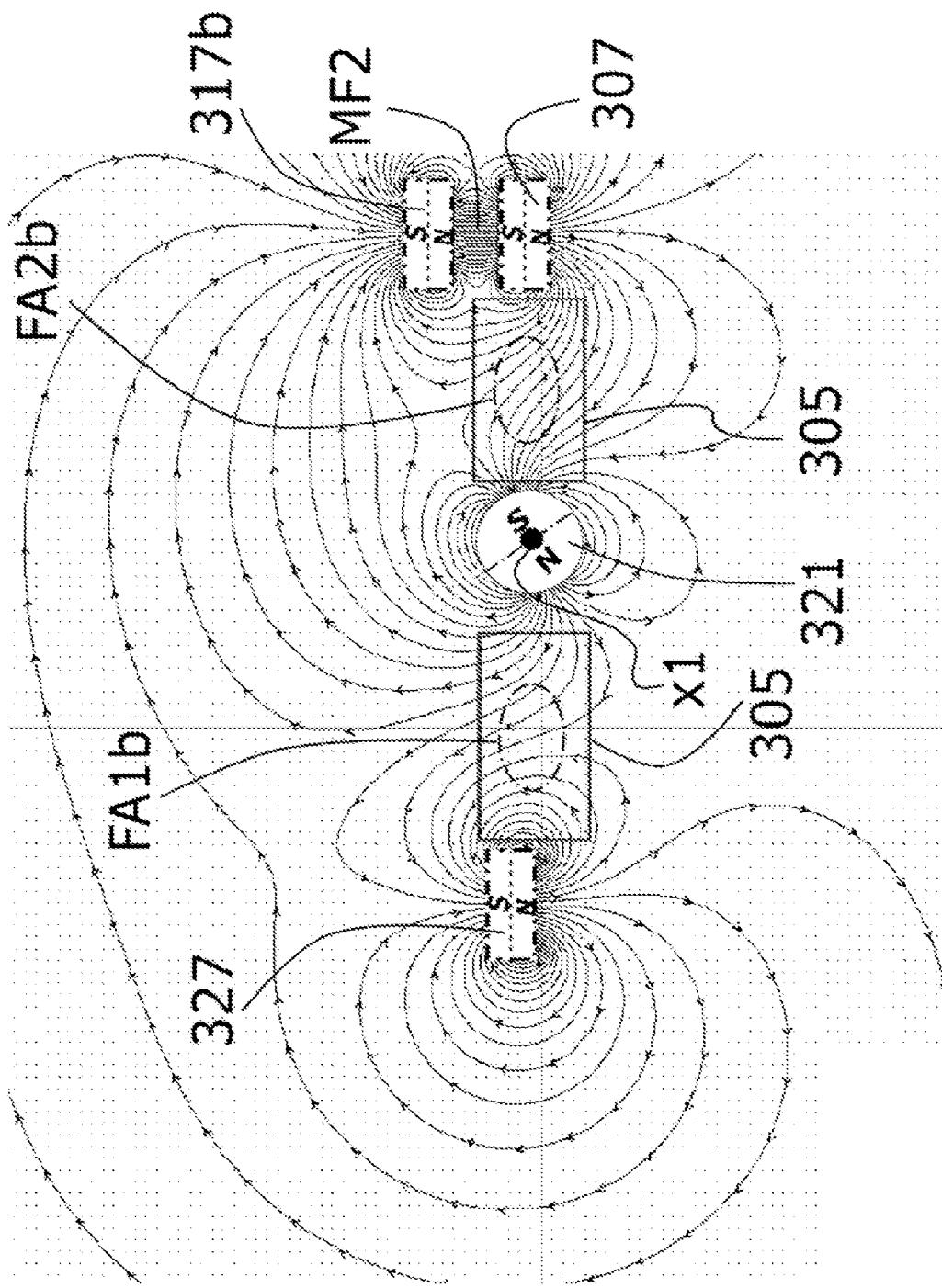
FIG. 7D is a schematic demonstrating the modeled magnetic field lines generated by the magnets of the embodiment shown in FIG. 4B when the slider is positioned over one of the stationary magnets with an arbitrary rotating magnet angular position.

FIG. 7D is a two-dimensional illustration of a computer simulation, created using "Vizimag," illustrating a state in which the slider 315 (see FIG. 2) has been pushed in the direction of second stationary magnet 307. The triggered action of the slider 315 and its disposed slider magnet's 317 movement changes the magnetic flux density and direction throughout the coil windings and the sample enclosed regions of the coil volume has magnetic flux lines passing through at right angles to the coil windings, thus by Faraday's Law inducing a voltage determined mathematically by the number of turns of the windings and the time derivative of the flux density changes. (Faraday's Law $V_{induced}=-N \Delta\Phi/\Delta t$, holds that the induced voltage (electromotive force) is directly proportional to the number of turns and the time derivative of the magnetic flux $\Phi$, which is a vector, and when flux changes by $\Delta\Phi$ in a time $\Delta t$. If voltage (emf—electromotive force) is induced in a coil, N is its number of turns. The minus sign means that the voltage (emf—electromotive force) creates a current I in a closed loop that generates a magnetic field B that oppose the change in flux $\Delta\Phi$—this opposition is known as Lenz's law).

FIG. 7D illustrates that the action of pushing (by an external force) the slider magnet 317 to the right of the rotating magnet 321 (as shown therein) and that causes the rotation of rotating magnet 321. The translational movement of the slider magnet 317 to the position shown in FIG. 7D causes an oscillation of the rotating magnet 321, which establishes a voltage at the coil terminals 305A & 305B.

FIG. 7D illustrates a state in which the slider magnet 317 of the exemplary embodiment of the generator utilizing two stationary magnets 327, 307 has been moved to be located over the second stationary magnet 307. The movement of the components of the generator includes the instant movement of the slider magnet 317 from the proximal center position (where there is a strong mutual attractive magnetic field MF1 seen in FIG. 7C between the slider magnet 317 and the rotating magnet 321) to the right end where the slider magnet 317 is distal from the rotating magnet 321 and located over the second stationary magnet 307 where there now exists a strong attractive magnetic field MF2. During this state change there are significant changes in the magnetic flux lines FA1*b* & FA2*b* that permeate the coil 305 and by Faraday's Law induce a voltage that is felt at the coil terminal ends 305A &305B.

FIG. 8A shows a perspective view 306A of the slider guide 311 where the elongated structure 313 has disposed the slider 315 (with its disposed slider magnet 317) and is free to slide along the side rail guides 331 and the abutment wall 311W is for stopping the slider 315 at the end of its travel during a push movement of the slider 315.

Figure 8B:
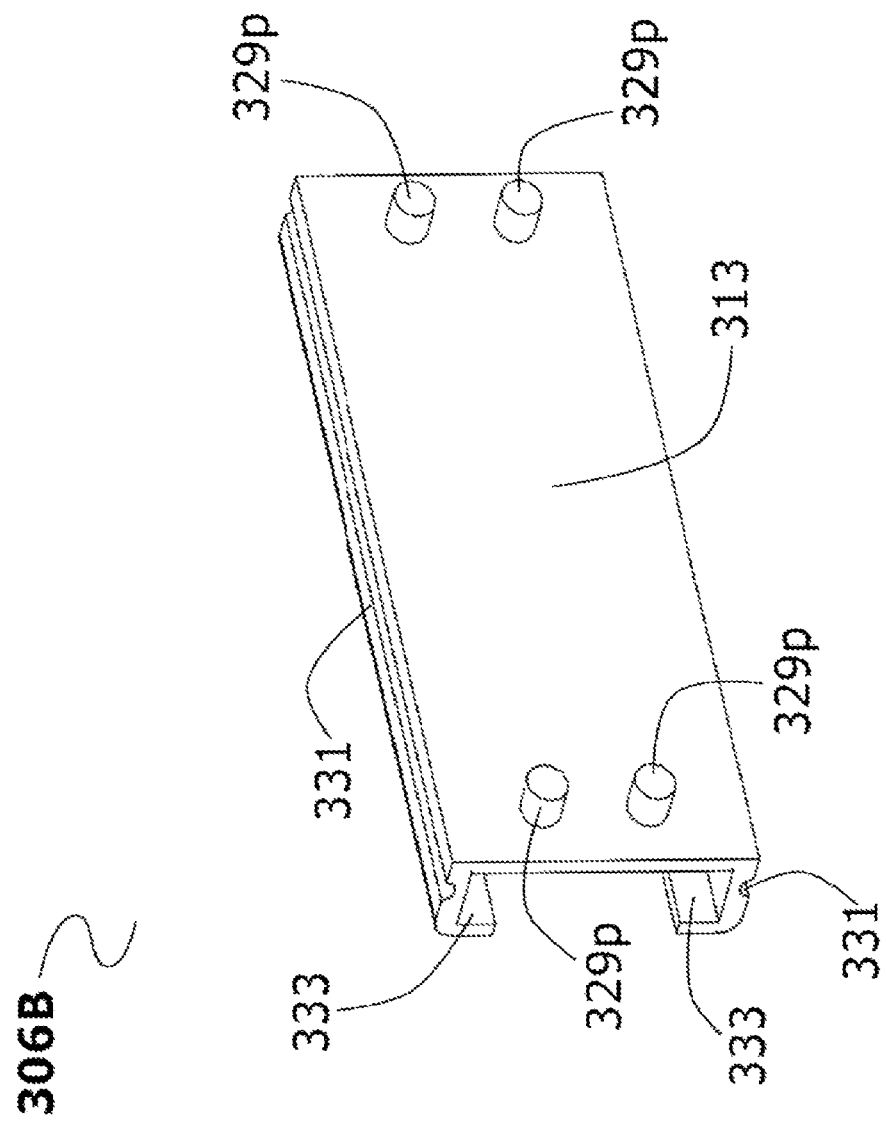
FIG. 8B is an additional perspective view of the slider guide of FIG. 8A.

FIG. 8B is a perspective view 306B the underside view of the slider guide 311 wherein there are, at opposite ends of the slider a pair of protrusions 329*p* for inserting the rail on top of the coil bobbin 303. Each of the two pairs of protrusions 329*p* are configured to snap into matching holes in the two opposite end stationary magnet enclosures 301L & 301R.

Figure 9A:
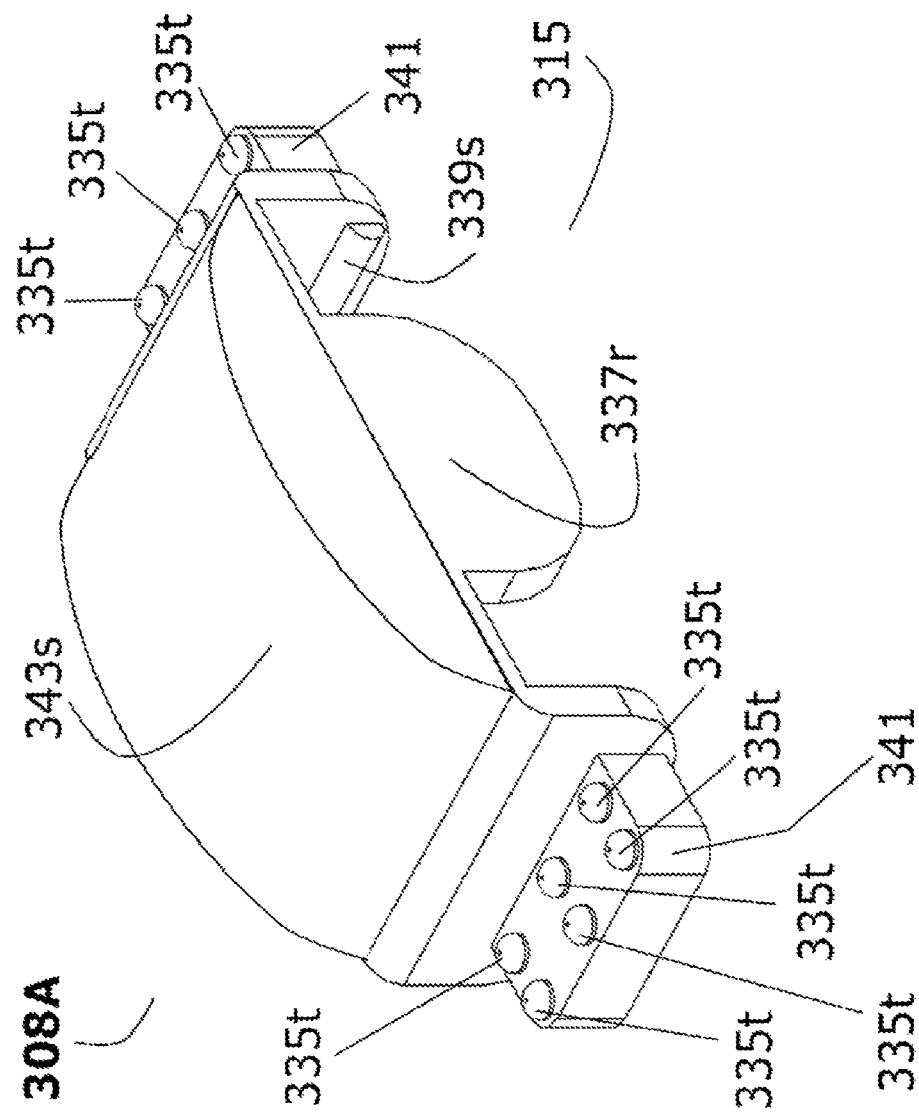
FIG. 9A is a perspective view of an exemplary slider mechanism which can be used with some implementations of the present subject matter.

FIG. 9A shows a top perspective view 308A of the slider 315. As shown, the slider 315 includes a heightened surface 343*s* for applying a finger for pushing, inner surface guide clearance tabs 337*r* & 337*l* that are in mechanical communication with the lower inner surface 333 of the runner rail guide as shown in FIGS. 8A-8B, As shown, the slider 315 also includes top nubs 335*t* disposed on side tabs 341 located on opposite sides of the slider 315 that can be in contact with an enclosure cover to reduce friction during movement of the slider 315, instead of a more voluminous construction that increases friction.

Figure 9B:
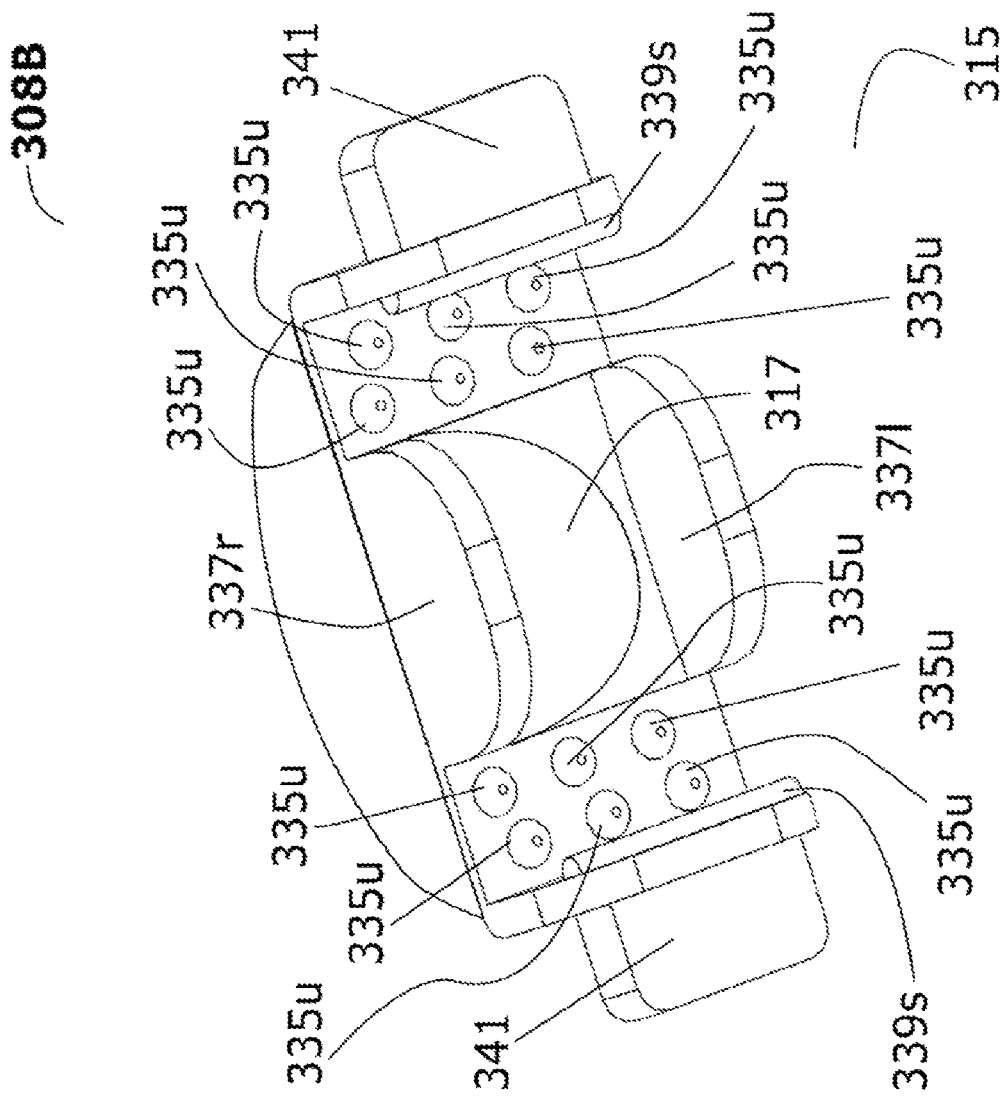
FIG. 9B is an additional perspective view of the slider mechanism of FIG. 9A.

FIG. 9B illustrates a bottom perspective view 308B of the slider 315. As shown, the slider 315 includes an arrangement of friction reducing nubs 335*u* disposed on the underside surface areas the right and left of the slider magnet 317 that reduces friction during sliding along the elongated structure 313 (on FIGS. 8A-8B). The side rails 339*s* are fitted for movement and disposed on both sides of the runner rail side guides 331 that are shown in FIGS. 8A-8B.

Figure 10A:
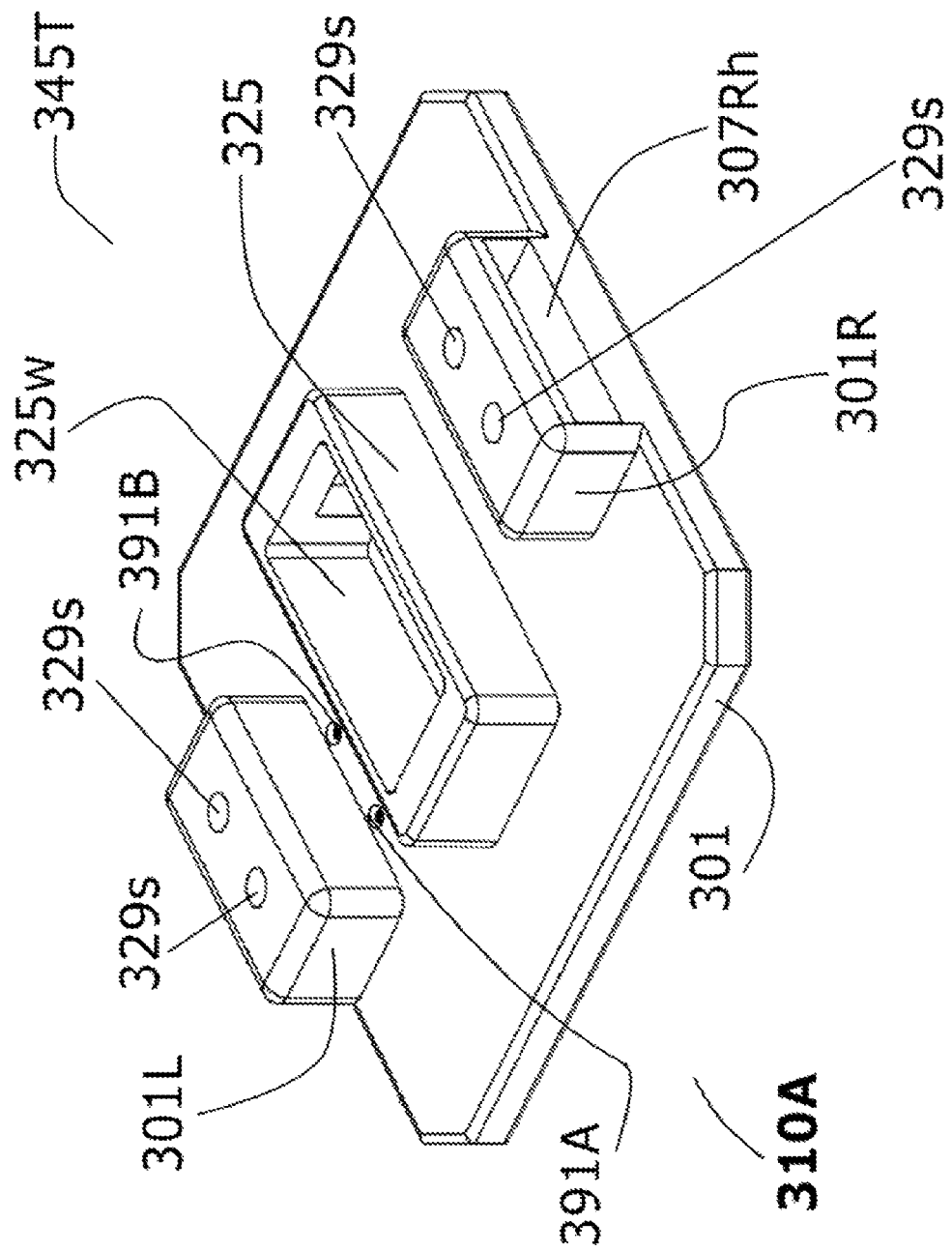
FIG. 10A is a perspective view of an exemplary generator substrate base which can be used with some implementations of the present subject matter.

FIG. 10A shows a top perspective view 310A of the base substrate 345T for the generator comprised of the flat base planar surface 301 both left and right stationary magnet enclosures 301R & 301L each with two through holes 329s for the runner rail fittings 329p (shown in FIG. 8B). There is a solid centered rectangular protrusion 325 with a rectangular through hole 325w with an enclosed region less in volume that that of the centered rectangular solid protrusion 325. The coil bobbin 303 (shown in FIG. 2) is inserted in and over the solid rectangular protrusion for support and allowing for maximum proximal closeness to the stationary magnets 327 & 307 when either one or both magnets are utilized in the exemplary embodiments described and shown herein.

Figure 10B:
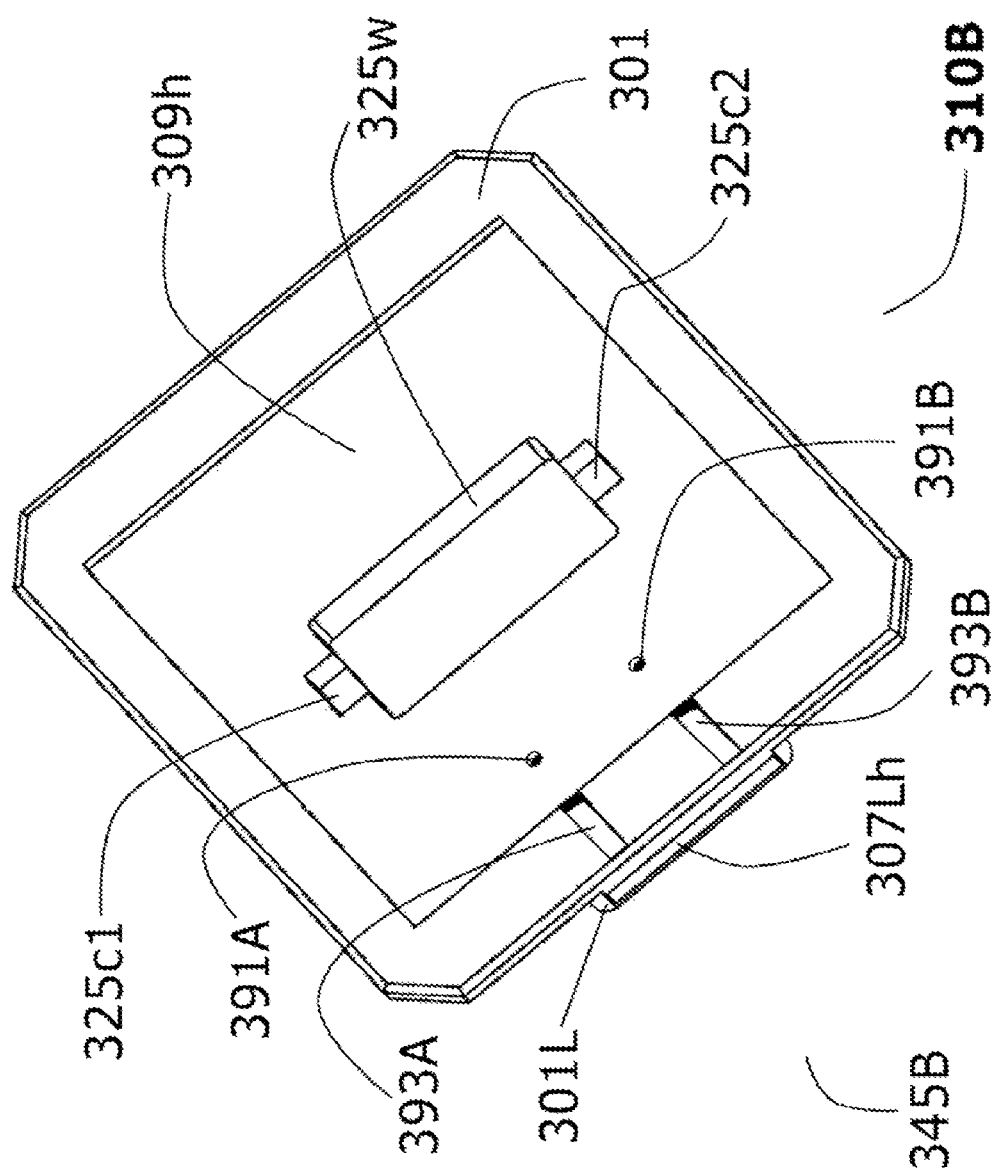
FIG. 10B is an additional perspective view of the generator substrate base of FIG. 10A.

FIG. 10B shows a bottom perspective view 310B of the base substrate 345B showing the bottom side of a through holed protrusion 325w that contains two blind extrusions 325c1 & 325c2 where the rotating magnet's 321 two opposite end axles 319A & 319B are disposed within allowing the cylindrical magnet 321 (shown in FIG. 11) to rotate freely 360 degrees of rotation. As shown in FIG. 10B the base substrate 345B has two through holes 391A & 391B for the end terminal wires 305A & 305B of the coil winding 305 to pass through, respectively, and there are two extrusions 393A & 393B acting as wire guides for the coil terminal wires 305A & 305B, respectively.

In FIG. 11 shows multiple views of the rotating magnet 321, which includes a front view 312A, a side view 312B, and a perspective view 312C. As shown in the front view 312A of the rotating magnet 321, the magnet 321 is a Neodymium cylindrical magnet that has a solid non-magnetic metal rod 319 disposed and passing through the rotating magnet center along its axis x1, and the non-magnetic metal rod 319 is equally extended beyond the length of the rotating magnet (which is diametrically poled through its diameter) so that there exists two opposite ended support axles of rotation 319A & 319B. As further shown in FIG. 11, the side view 312B shows the poles of the diametrically poled rotating magnet 321; and, in the perspective view 312C also included in FIG. 11, the rotating magnet with its built in axles 319A & 319B is present without a separate enclosure to support a magnet that lacks axles for rotation. The inclusion of a disposed non-magnetic metal rod 319 can allow for faster production techniques and can provide a closer proximal distance between the magnets and the coil windings 305; since the magnetic field varies to the inverse cube of the coil to magnet separation (in air) distance, thus optimizing the overall power performance of the present subject matter.

Figure 12A:
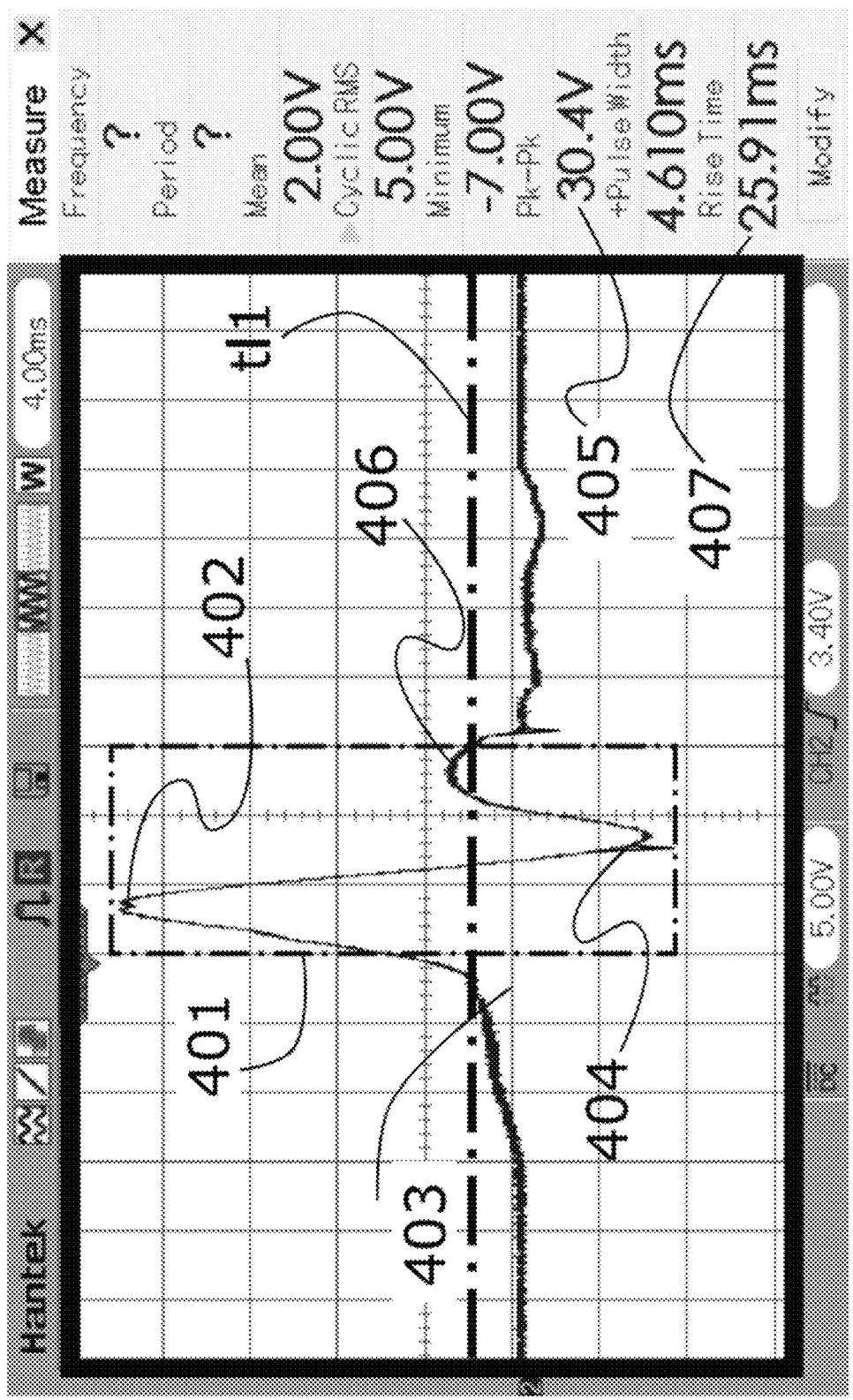
FIG. 12A is a first oscilloscope trace of a waveform of an output during a state change of a generator in accordance with some implementations of the present subject matter.

FIG. 12A is a typical measured output waveform during a slider push moving from a center position to an end position (see FIG. 6A). The oscilloscope waveforms show that there initially is a positive going large voltage spike 402 followed by a negative pulse yielding a value of +30.4 volts p-p 405 for a time measured along a horizontal base line of zero volts reference 403, and as the rotating magnet bi-directionally rotates for a few cycles after the push is completed, a fast ring-down of the alternating waveform is shown in the effective window of useful duration 401, and based on a minimum oscilloscope trigger level t11 of +3.4 volts DC that gives for that initial pulse a useful window of 6 milliseconds. Then for the second cycle negative going second pulse 404, its effective window is approximately 4 milliseconds, and finally a third lesser positive going pulse 406 that gives a window of 4 milliseconds. As such, a significant generated voltage is available for a duration of 14 milliseconds to supply energy to a load.

Figure 12B:
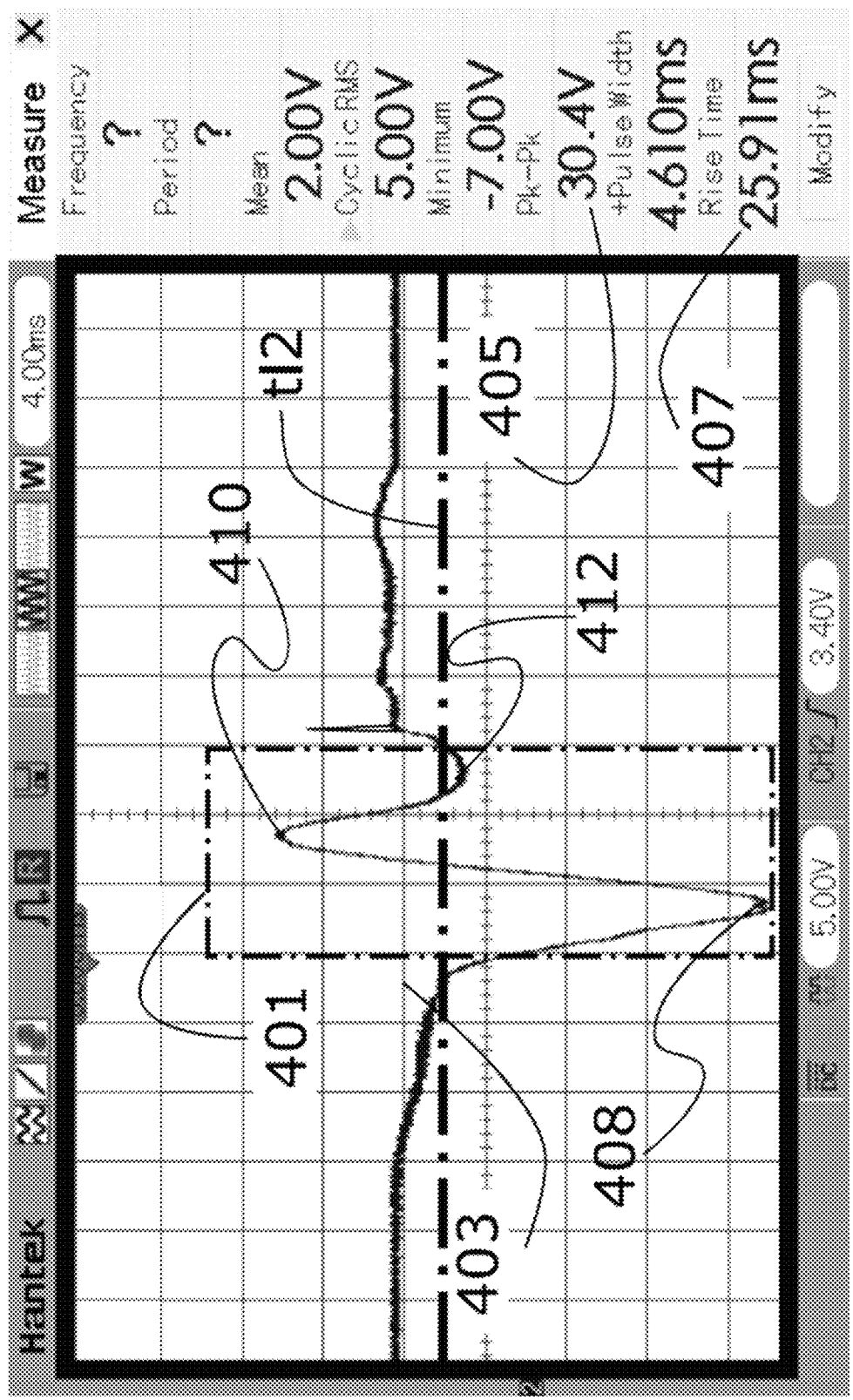
FIG. 12B is a second oscilloscope trace of a waveform of an output during a state change of a generator in accordance with some implementations of the present subject matter.

In FIG. 12B, is a typical measured output waveform during a slider push moving from an end position to the center position (see FIG. 6B). The oscilloscope waveforms show that there initially is a negative going large voltage spike 408 yielding a value of −30.4 volts p-p 405 for a time measured along a horizontal base line of zero volts reference 403, and as the rotating magnet bi-directionally rotates for a few cycles after the push is completed, a fast ring-down of the alternating waveform is shown in the effective window of useful duration 401, and based on a minimum oscilloscope trigger level t12 of −3.4 volts DC that gives for that initial pulse a useful window of 6 milliseconds. Then for the second cycle positive going second pulse 410, its effective window is approximately 4 milliseconds, and finally a third lesser negative going pulse 412 that gives a window of 4 milliseconds. As such, a significant generated voltage is available for a duration of 14 milliseconds to supply energy to a load.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

The invention claimed is:

1. An electrical generator, comprising:
   a plurality of turns of wire forming a coil, the plurality of turns of wire having a first terminal end and a second terminal end;
   a first magnet positioned in the coil, the first magnet having an axis of rotation and being configured to rotate within the coil about the axis of rotation;
   at least one second magnet positioned about the coil; and
   a slider movable normal to the axis of rotation from at least one first position aligned with an outer surface of the first magnet to at least one second position aligned with an outer surface of the at least one second magnet, wherein movement of the slider causes the first magnet to rotate about the axis of rotation, thereby inducing a voltage across the first terminal end and the second terminal end.

2. The electrical generator of claim 1, wherein the at least one second magnet is configured to maintain the slider in the at least one second position.

3. The electrical generator of claim 1, wherein the slider comprises a slider magnet.

4. The electrical generator of claim 3, wherein the slider magnet has a first magnetic polarity and a first orientation and the at least one second magnet has a second magnetic polarity and a second orientation, and wherein the first orientation differs from the second orientation.

5. The electrical generator of claim 3, wherein the slider magnet includes a north pole and an opposing south pole and wherein the north pole of the slider magnet is configured to face the first magnet when the slider is in the first position and face the at least one second magnet when the slider is in the at least one second position.

6. The electrical generator of claim 5, wherein the at least one second magnet includes a north pole and an opposing south pole and wherein the south pole of the at least one second magnet is configured to face the slider magnet when the slider is in the at least one second position.

7. The electrical generator of claim 3, wherein the slider magnet includes a north pole and an opposing south pole and wherein the south pole of the slider magnet is configured to face the first magnet when the slider is in the first position and face the at least one second magnet when the slider is in the at least one second position.

8. The electrical generator of claim 7, wherein the at least one second magnet includes a north pole and an opposing south pole and wherein the north pole of the at least one second magnet is configured to face the slider magnet when the slider is in the at least one second position.

9. The electrical generator of claim 3, wherein the slider comprises at least one nub positioned to contact the substrate and to reduce friction when the slider is moved.

10. The electrical generator of claim 1, further comprising at least one third magnet positioned about the coil opposite from the at least one second magnet about the axis of rotation, wherein the slider is movable normal to the axis of rotation from the at least one first position to at least one third position aligned with an outer surface of the at least one third magnet.

11. The electrical generator of claim 10, wherein movement of the slider causes the first magnet to rotate in repeated oscillations about the axis of rotation, thereby inducing a voltage across the first terminal end and the second terminal end.

12. The electrical generator of claim 11, wherein the at least one third magnet is configured to maintain the slider in the at least one third position.

13. The electrical generator of claim 11, wherein the first magnet, the at least one second magnet and the at least one third magnet are substantially aligned in a common plane.

14. The electrical generator of claim 1, wherein the plurality of turns of wire, the first magnet, and the at least one second magnet are disposed in a substrate, and wherein the slider is coupled to the substrate and movable along the substrate.

15. An electrical generator, comprising:
a nanomaterial substrate having a first terminal end and a second terminal end;
a first magnet positioned in the nanomaterial substrate, the first magnet having an axis of rotation and being configured to rotate within the nanomaterial substrate about the axis of rotation;
at least one second magnet positioned about the nanomaterial substrate; and
a slider movable normal to the axis of rotation from at least one first position aligned with an outer surface of the first magnet to at least one second position aligned with an outer surface of the at least one second magnet, wherein movement of the slider causes the first magnet to rotate about the axis of rotation, thereby inducing a voltage across the first terminal end and the second terminal end.

16. The electrical generator of claim 15, wherein the at least one second magnet is configured to maintain the slider in the at least one second position.

17. The electrical generator of claim 15, wherein the slider comprises a slider magnet.

18. The electrical generator of claim 17, wherein the slider magnet has a first magnetic polarity and a first orientation and the at least one second magnet has a second magnetic polarity and a second orientation, and wherein the first orientation differs from the second orientation.

19. The electrical generator of claim 17, wherein the slider magnet includes a north pole and an opposing south pole and wherein the north pole of the slider magnet is configured to face the first magnet when the slider is in the first position and face the at least one second magnet when the slider is in the at least one second position.

20. The electrical generator of claim 17, wherein the slider magnet includes a north pole and an opposing south pole and wherein the south pole of the slider magnet is configured to face the first magnet when the slider is in the first position and face the at least one second magnet when the slider is in the at least one second position.

* * * * *